(12) United States Patent
Soderqvist

(10) Patent No.: US 11,179,643 B2
(45) Date of Patent: Nov. 23, 2021

(54) CONTROLLING A USER INTERFACE

(71) Applicant: KING.COM LIMITED, St. Julians (MT)

(72) Inventor: Michael Soderqvist, St. Julians (MT)

(73) Assignee: KING.COM LTD., St. Julians (MT)

( * ) Notice: Subject to any disclaimer, the term of this patent is extended or adjusted under 35 U.S.C. 154(b) by 0 days.

(21) Appl. No.: 16/722,757

(22) Filed: Dec. 20, 2019

(65) Prior Publication Data
US 2021/0187399 A1 Jun. 24, 2021

(51) Int. Cl.
*A63F 13/822* (2014.01)
*A63F 13/52* (2014.01)
*A63F 13/23* (2014.01)

(52) U.S. Cl.
CPC ............ *A63F 13/822* (2014.09); *A63F 13/23* (2014.09); *A63F 13/52* (2014.09); *A63F 2300/1025* (2013.01); *A63F 2300/807* (2013.01)

(58) Field of Classification Search
CPC ... A63F 13/822; A63F 13/52; A63F 2300/807
See application file for complete search history.

(56) References Cited

U.S. PATENT DOCUMENTS

| | | | |
|---|---|---|---|
| 2017/0072297 A1* | 3/2017 | Lehwalder | A63F 13/537 |
| 2017/0274288 A1* | 9/2017 | Walls | A63F 13/20 |
| 2019/0232155 A1* | 8/2019 | Darabian | A63F 13/77 |

OTHER PUBLICATIONS

Video Game, Bejeweled Stars, released May 10, 2016 (as evidenced by a game play video published May 15, 2016, available online: https://www.youtube.com/watch?v=3Go9juoVHm0) (Year: 2016).*
Video game: Candy Crush Saga, published in 2011 (as evidence by an online article published Aug. 23, 2018 by Alyssa Avina, Candy Crush: 30 Awesome Tips and Tricks Only the Best Players Know: available on https://www.thegamer.com/candy-crush-tips-tricks-pro-players/) (Year: 2011).*

* cited by examiner

*Primary Examiner* — James S. McClellan
(74) *Attorney, Agent, or Firm* — Saul Ewing Arnstein & Lehr LLP

(57) ABSTRACT

According to a first aspect, there is provided a computer device having a user interface and a processor. The user interface is configured to provide a gameboard comprising tiles supporting game objects. A pre-defined plurality of the tiles constitutes a segment of the gameboard supporting a group of game objects. The user interface is configured to detect user input when a user engages with a user activatable game element. The processor is configured to receive a detected user input, detect a match game condition of a plurality of adjacent game elements having matching characteristics, and, if the match condition is detected, remove the plurality of game elements and generate new game elements to replenish the gameboard. The processor is further configured to detect a segment condition associated with the segment, and, if detected, to replace the group of game objects of the segment with a replacement group of game objects.

24 Claims, 19 Drawing Sheets

CONTROLLING A USER INTERFACE

FIELD OF INVENTION

The present invention relates to controlling a user interface responsive to user engagement with display elements on the interface of a computer device.

BACKGROUND OF THE INVENTION

When creating computer devices on which computer-implemented games are executed, there are many technical challenges when considering how the game is to be effectively implemented on the device and how the user interface is to be controlled.

One technical challenge can involve allowing a game to be fun and compelling even when there is limited display resource available, such as when a game is being played on a smartphone, tablet or other minicomputer. Another significant challenge is that of user engagement. Engagement involves designing gameplay to be engaging and rewarding to players. This typically requires games to be easily understood at their simplest or introductory levels, providing rewarding gameplay with quite simple game mechanics, but becoming progressively more challenging so that players are not bored, but remain engaged and develop rewarding skills. Effective engagement requires various forms of feedback to reinforce player sense of success and accomplishment.

An existing type of match-three game is a so-called "switcher" game. A match-three game is a type of casual puzzle game where the player is required to find patterns on a seemingly chaotic board. The player then has to match a plurality of the same type of game element on the game board and those matched elements will then disappear. In a match-three game, the plurality comprises three or more game elements. In a switcher game, the player switches the locations of two adjacent game elements on the game board so that one or both of them create a chain of at least three adjacent game elements of the same type. Those matched game elements will then disappear. The game board is then repopulated with game objects.

One such known match three-type game is known by the trade name Candy Crush Soda Saga™. In that game, the game board is repopulated with game elements which are perceived as falling downwards onto the game board from the top edge of the screen from which the game is played.

Another known type of game is "linker" game, where a sequence of game elements are linked to form a known sequence, such as a word, which can be matched to a dictionary. When a known sequence is linked, game elements in the link are removed from the gameboard.

A "clicker" game is a type of casual puzzle game where the player is required to find patterns on a seemingly chaotic board. The player then has to match a plurality of the same type of game element on the game board and those matched elements will then be removed from the board. The player matches adjacent game elements of the same type by selecting one or more of the game elements in the group of matching elements. The matched elements are then removed from the gameboard. In a clicker game, the plurality may be two or more game elements.

Computer devices which are configured to provide such games need to be constructed to deliver game modes in an engaging and user-friendly way.

This patent specification describes not only various ideas and functions, but also their creative expression. A portion of the disclosure of this patent document therefore contains material to which a claim for copyright is made and notice is hereby given: Copyright King.com Limited 2019 (pursuant to 17 U.S.C. 401). A claim to copyright protection is made to all screen shots, icons, look and feel and all other protectable expression associated with the games illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

SUMMARY OF THE INVENTION

Aspects of the present invention provide an improved computer device having a user interface which is controlled to provide a computer-implemented game of a matching type (switcher, clicker or linker). The device is configured to provide a solution to the technical problem of improved user engagement by providing a new user engagement mode, which is implemented by a processor configured by a game code with a data structure held in memory in the computer device.

According to a first aspect of the present invention, there is provided a computer device having: a user interface configured to provide a game board comprising tiles supporting game objects, wherein at least some of the tiles support game objects which are user activatable game elements of differing characteristics, and at least some others of the tiles support game objects which are blocking elements which are unresponsive to user engagement, wherein a pre-defined plurality of the tiles constitutes a segment of the game board supporting a group of game objects; the user interface configured to detect user input when a user engages with a user activatable game element; and a processor configured to receive a detected user input with a user activatable game element, detect a match game condition of a plurality of adjacent user activatable game elements having matching characteristics, and configured to remove the plurality of game elements of the match game condition when a match game condition is detected and to generate new game elements to replenish the game board; the processor further configured to detect a segment condition associated with the pre-defined plurality of tiles of the segment, and in that case to replace the group of game objects on the tiles of the segment with a replacement group of game objects.

The group of game objects on the predefined plurality of tiles of the segment may comprise at least one blocking element, and wherein the processor may be further configured to detect if the user input causes a blocking element removal condition to be satisfied and if so, to remove one or more blocking element from the segment, wherein the segment condition is a condition in which no blocking element remains on the predefined plurality of tiles of the segment.

The game objects of the replacement group may be provided on the gameboard at the same time.

The replacement group of game objects may be a pre-defined group.

The replacement group of game objects may be a randomised group of game objects.

A path comprising path components to be rendered on the gameboard may be generated, wherein at least one path component may be displayed on an initial game board, and at least one path component may be missing on the initial game board, the missing path component provided at one or more tiles of the segment after the replacement group of game objects is provided on the gameboard.

At least one of the game objects of the replacement group of game objects may provide a visual indication of the missing path component. The computer device may be configured to render a visual enhancement of path components when connected by a previously missing path component now provided on the gameboard.

The path may be generated from a defined origin tile to a defined target tile.

The path may comprise at least one branch component.

After the removal of a blocking element from the segment, the supporting tile of the segment may be replenished with a new game object, unless detection of the segment condition has caused replacement of the group of game objects on the tiles of the segment with the replacement group of game objects.

The replacement group of game objects may comprise blocking elements.

The replacement group of game objects may comprise booster elements.

The replacement group of game objects may comprise game objects which comprise freeable elements, the freeable element being released from the game object when the match game condition is detected adjacent to the game object, the freeable element contributing to a game objective.

The replacement group of game objects may comprise a combination of any of blocking elements and user activatable game elements.

A 3D visual animation of providing the replacement group of game objects may be rendered as a flipping of a plane of tiles from a first virtual image of the game objects in an initial group of game objects on one side of the plane to a second visual animation of the replacement group of game objects on the other side of the plane.

A visual indication of the segment may be rendered to the user.

The blocking element removal condition may be satisfied if the blocking element is adjacent to at least one of the game elements of the match game condition.

The blocking element removal condition may be satisfied if the blocking element comprises a last layer of a multi-layer blocking element, the other layers of the blocking element having previously been removed from the gameboard in one or more prior blocking element layer removal condition.

The pre-defined plurality of tiles of the segment may be adjacent to one another.

According to a second aspect of the present invention, there is provided a method of controlling a user interface, the method comprising: providing a game board at the user interface comprising tiles supporting game objects, wherein at least some of the tiles support game objects which are user activatable game elements of differing characteristics, wherein a pre-defined plurality of the tiles constitutes a segment of the game board supporting a group of game objects; detecting user input at the user interface when a user engages with a user activatable game element; and receiving at a processor a detected user input with a user activatable game element, detecting a match game condition of a plurality of adjacent user activatable game elements having matching characteristics, removing the plurality of game elements of the match game condition when a match game condition is detected, and generating new game elements to replenish the game board; and detecting by the processor a segment condition associated with the pre-defined plurality of tiles of the segment, and in that case replacing the group of game objects on the tiles of the segment with a replacement group of game objects.

According to a third aspect of the present invention, there is provided a non-transitory computer readable medium comprising computer-executable code which when executed by one or more processing units causes the following method to be performed, the method comprising: providing a game board at the user interface comprising tiles supporting game objects, wherein at least some of the tiles support game objects which are user activatable game elements of differing characteristics, wherein a pre-defined plurality of the tiles constitutes a segment of the game board supporting a group of game objects; detecting user input at the user interface when a user engages with a user activatable game element; and receiving at a processor a detected user input with a user activatable game element, detecting a match game condition of a plurality of adjacent user activatable game elements having matching characteristics, removing the plurality of game elements of the match game condition when a match game condition is detected, and generating new game elements to replenish the game board; and detecting by the processor a segment condition associated with the pre-defined plurality of tiles of the segment, and in that case replacing the group of game objects on the tiles of the segment with a replacement group of game objects.

BRIEF DESCRIPTION OF THE FIGURES

For a better understanding of the present invention and to show how the same may be carried into effect, reference will now be made by way of non-limiting example to the accompanying drawing, in which.

DETAILED DESCRIPTION OF THE INVENTION

Figure 1:
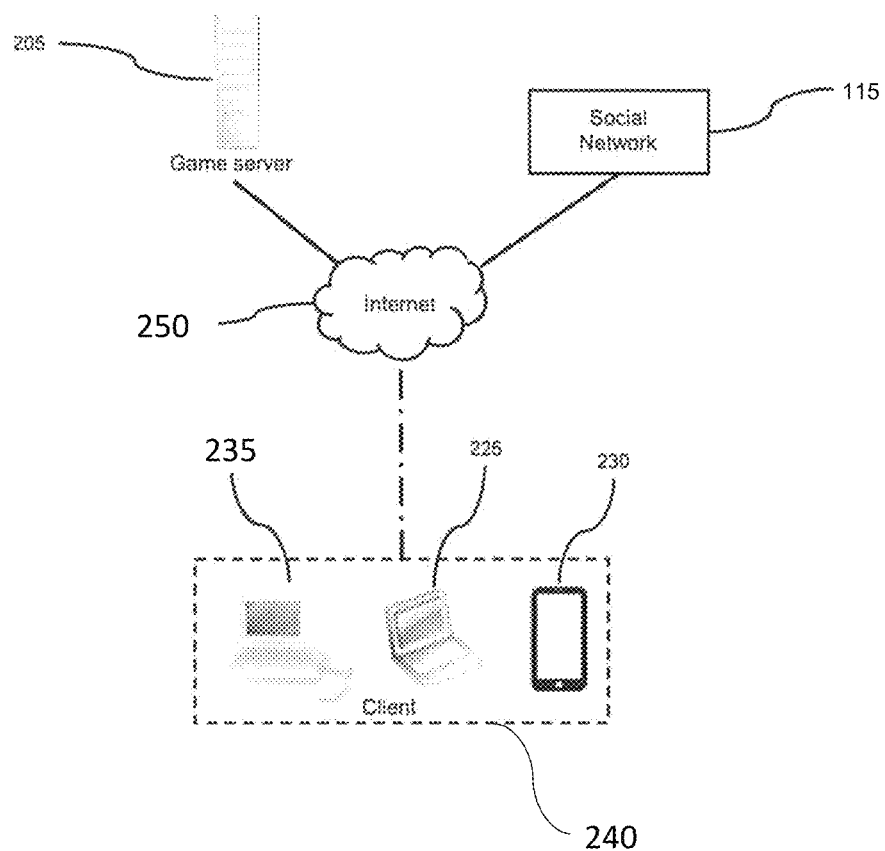
FIG. 1 shows an exemplary overall environment for implementing the present invention.

The embodiments of the present invention described herein provide an improved computer device configured by computer code to implement a new game feature and a new game mode, with improved user engagement. The game code is stored in a memory and executed by at least one processor to configure the device.

According to the new game feature, an initial gameboard is provided to a user comprising tiles. At least one segment is provided on the gameboard, the segment being a predefined plurality of tiles of the gameboard. There is defined a segment condition which the user attempts to satisfy through gameplay. When the segment condition has been satisfied, the game objects associated with the group of tiles comprising the segment are removed from the gameboard and replaced with a replacement group of game objects. Note, this new game feature is implemented in addition to the goal of removing game objects from the gameboard. A user input associated with the user engaging with a user activatable elements is detected. Game elements are removed if a match game condition of a plurality, e.g. at least two, adjacent user activatable game elements having matching conditions is detected, where at least one of the matching game elements is associated with the user input. After removal of the matching game elements, new game elements are generated to replenish the gameboard. In one embodiment, the segment condition is that no blocking elements remain on any of the predefined tiles of the segment.

According to the new game mode, there is a path defined on the gameboard. The path comprises path components. Initially, some or all of the path components are missing from the gameboard. The user must connect the path defined on the gameboard in order to complete a level associated with the gameboard. The gameboard comprises one or more segments, as described above, the missing path components being associated with the segments. When the user satisfies the segment condition, the replacement group of game objects is provided, which may comprise path components. These path components may be rendered visible to the user after the replacement group of game objects is provided on the gameboard, or, where a replacement game object is a blocking element, be obscured until the blocking element is removed.

The user may progress through a series of levels in a saga format. The user selects one of a number of playable levels presented to him on an interface. The levels may be represented on a 'virtual map', such that the progress of the player is represented as a journey along a path on the virtual map. Note, this path differs from the path referred to with reference to connecting the start and end points in the new game mode. When the user selection is detected, the level the user has selected is displayed to the user as a gameboard comprising user selectable game elements. Each level may have different goals associated with it which the user has to achieve in order to complete the level. The predefined criteria associated with the connection of the start and end point on the gameboard may be embodied in a set of rules for each level, or may be common to multiple levels.

The terms user and player are used interchangeably throughout this document and no specific meaning is intended using one or the other unless the context suggests otherwise.

In the following description of various implementations of the invention, reference is made to the accompanying drawings which form part thereof, and in which is shown by way of illustration various implementations in which the invention may be utilized. It is to be understood that the other implementations may be utilized, and structural and functional modifications may be made without departing from the scope of the present invention.

The techniques described herein can be deployed in many different gameplay architectures. For example, a computer device can be configured by a computer game executed on the device. The game may be implemented as a computer program (e.g. game code) that is stored locally in the memory of a PC, games console, tablet or mobile telephone or other computing device. The game can be implemented solely as a computer program that is stored and runs entirely on one of many processors in a remote server, and data streams or updates are supplied to the client device (e.g. tablet, smartphone, etc.) to enable the client to render and display graphics and sounds; this web services' approach is increasingly common.

Another possible infrastructure is a hybrid one, in which back-end servers handle some elements of the gameplay, and for instance a Java game applet is provided to client devices and it is the locally running Java applet that configures the client device to generates the graphics/sounds/user interaction for gameplay on the player's client device. Some data may be fed back to the back-end servers to enable scoring, interaction with other players and cross-platform synchronisation. Generally, the techniques described in this specification are not specific to any one game architecture but can be deployed on any suitable game architecture.

In implementations where some or all elements of game code are executed on a remote server, users may be able to share their gaming experiences with other users. They may, for example, be able to share the scores they have achieved in a level with other players, which may be used to generate a leader board. Users may be able to choose which other users to share their scores with, for example their friends on a social media platform such as Facebook. This gives a social aspect to the game.

FIG. 1 portrays an exemplary overall environment in which the present invention can be utilized. A virtual game is stored on, for instance, a game server 205. The virtual game is to be played on a client device 240, such as a computer 235, 225 or a smartphone or other handheld device 230. The client device 240 can also be a kiosk, arcade gaming station, smart TV or other device with computing capabilities, input devices, and a screen that can present the game to a user. The client device communicates with the game server 205 and a social network server 115, for instance through the Internet 250 or other network. It should be understood that the social network server 115 and the game server 205 do not have to be located in different places, they could be on the same server or on a plurality of servers located in different locations. People skilled in the art will understand that other devices than the exemplary ones listed can also be used without departing from the spirit and scope of the invention.

The game can be implemented in a computer device having a user interface allowing a user to interact with it in different ways depending on the capabilities of the client device 240 which the user is accessing the game with. A user can interact with the game through using a touch screen where the user can select and/or move elements on the game board with a finger or for instance with a stylus. The game can also be played with a pointing device such as a mouse or other interaction devices such as keyboard while the game is displayed to a user on a separate display of the user interface.

Mobile devices may have a touch screen interface where the player can interact with the game using a finger or a pointing device such as a stylus. Some mobile devices have hard keys that complement the touch screen interface. Such hard keys may be in the form of a button or in the form of a joystick type of interaction.

Figure 2:
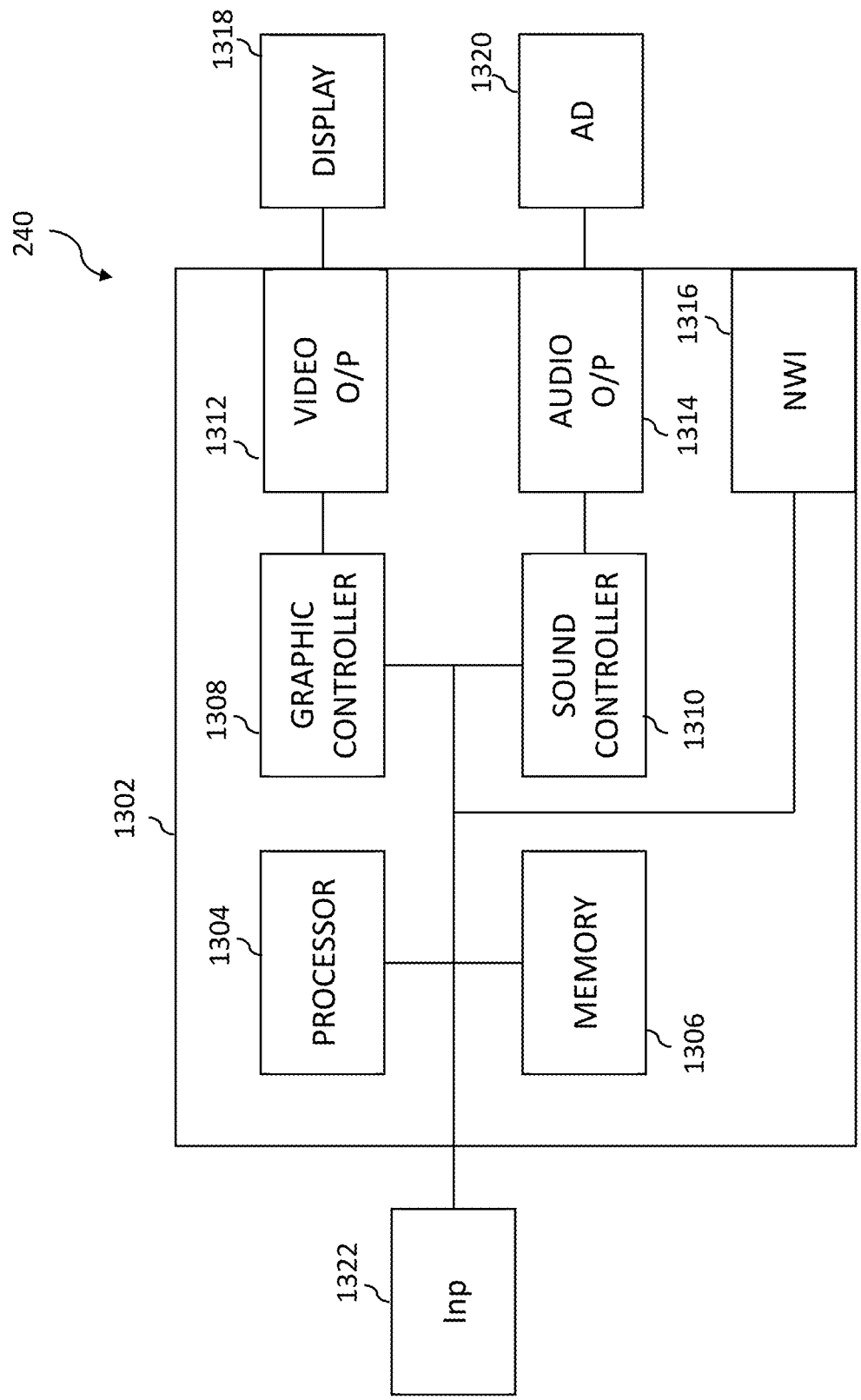
FIG. 2 shows a schematic view of a user device.

A schematic view of the user or computing device 240 according to an embodiment is shown in FIG. 2. The user device has a controller 1302. The controller 1302 may have one or more processors 1304 and one or more memories 1306. The controller 1302 is also shown as having a graphics controller 1308 and a sound controller 1310. It should be appreciated that one or other or both of the graphics controller 1308 and sound controller 1310 may be provided by the one or more processors 1304. Other functional blocks may also be implemented by suitable circuitry or computer code executed by the one or more processor 1304.

The graphics controller 1308 is configured to provide a video output 1312. The sound controller 1310 is configured to provide an audio output 1314. The controller 1302 has a network interface 1316 allowing the device to be able to communicate with a network such as the Internet 250 or other communication infrastructure.

The video output 1312 may be provided to a display 1318. The audio output 1314 may be provided to an audio device 1320 such as a speaker and/or earphones(s).

The device 240 may have an input device 1322. The input device 1322 can take any suitable format such as one or more of a keyboard, mouse, touch screen, joystick or game controller. It should be appreciated that the display 1318 may in some embodiments also provide the input device 1322, for example, by way of an integrated touch screen.

The blocks of the controller 1302 are configured to communicate with each other via an interconnect such as a bus or any other suitable interconnect and/or by point to point communication.

It should be appreciated that, in some embodiments, the controller 1302 may be implemented by one or more circuits, at least in part.

It should be appreciated that embodiments may be deployed in different system architectures. For example, the computer game may be implemented as a computer game that is stored in the memory 1306 of the user device 240. However, when online, the server 205 may handle some elements of the game in some embodiments. By way of example only, a Java game applet may be provided to the user device 240 and the locally running Java applet will generate, for example, the graphics, sounds, and user interaction for the game play on the user device 240. Java applet can have sufficient information to allow offline gameplay when the user device is no longer in communication with the game server 205, e.g. if connectivity is lost.

In some embodiments, the game may be implemented as a computer program that is stored in a memory system, for example the server 205, and which runs on the processor of the game server. Data streams or updates are supplied to the user device 240 to allow the user device 240 to render and display graphics and sounds in a browser of the user device 240.

The following describes an implementation using a 'switcher' mechanic where groups of 3 or more matching objects (referred to in this document as blocks or game elements) are created when a user switches two adjacent blocks and the resulting matching adjacent objects are automatically removed.

Figure 3:
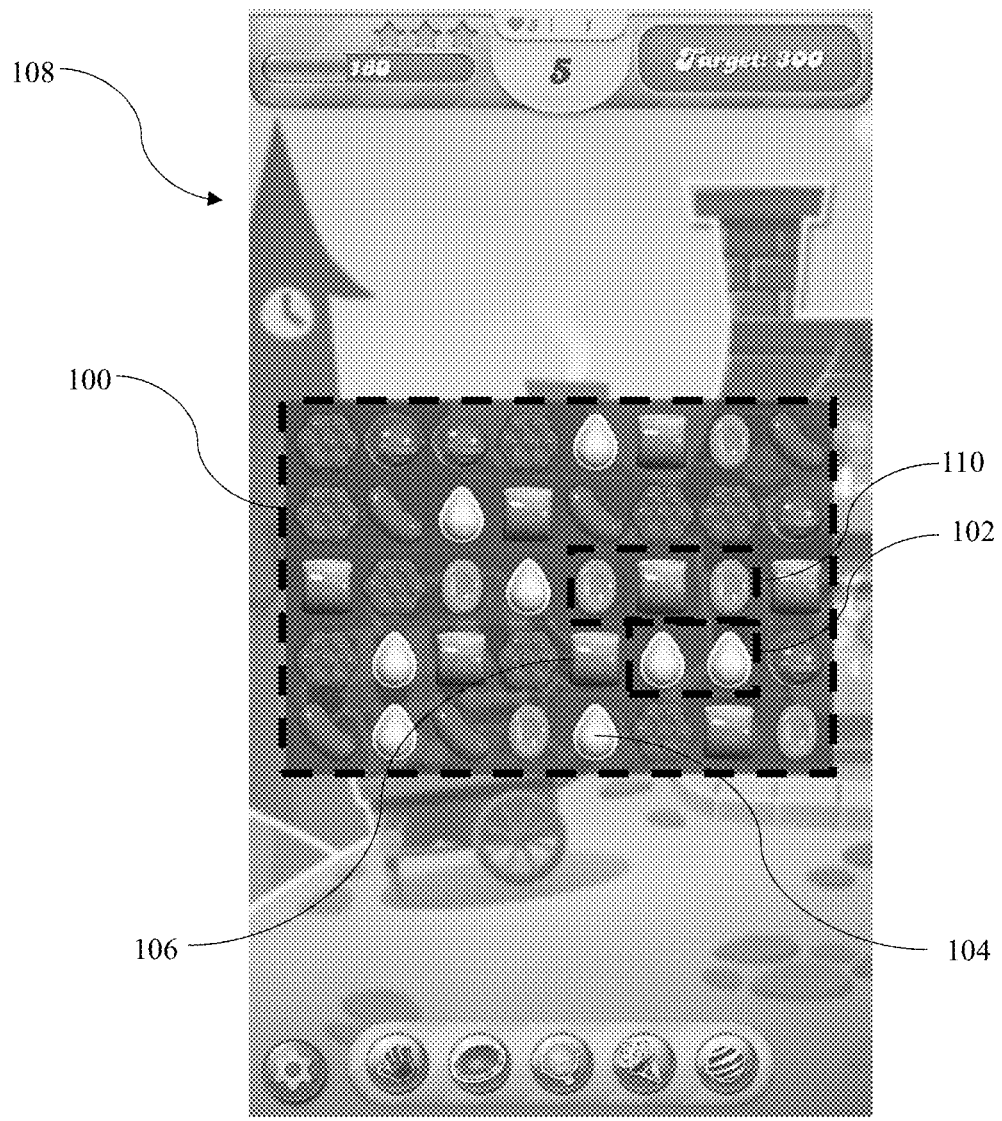
FIG. 3 shows an example of a "switcher" game.

FIG. 3 shows an example of a game play display 108 of a switcher game. A gameboard 100 corresponding to grid 80 of tiles is filled with blocks or objects of different shapes and colours. There is a pair of matching adjacent pear drops 102. The user can select the square element 106 and pear drop element 104 in order to switch their respective tile locations on the gameboard 100. In some embodiments, switching can be by selecting the two elements to be switched. In other embodiments, the user can select the pear drop element 104 and drag it towards the location of the square element 106 in order to switch their respective tile locations. Once the dragged element is at a certain threshold distance of its 'switching' element (in this case square element 106), the switch automatically occurs. By switching the pear drop element 104 and the square element 106, a group of 3 matching adjacent pear drops is created which is subsequently removed from the gameboard 100.

After the matching adjacent pear drops are removed, the tiles in which the now removed pear drop elements were located are rendered empty. The blocks occupying the tiles above the now empty tiles fall downwards to fill the empty tiles, as determined by refill physics. Refill physics determines the direction of movement of game elements on the gameboard. For example, the game elements in tile locations 110 fall downwards to fill the tiles rendered empty after the removal of the matching pear drop elements. This is repeated up the gameboard until the only empty tiles are at the top of the gameboard. It will be appreciated that different tiles on the gameboard may be associated with different refill physics, such that replacement game elements move in different directions at different tile locations on the gameboard. This is described further in our previous U.S. application Ser. No. 14/183,997, filed Feb. 19, 2014, which is fully incorporated herein by reference. New blocks are spawned at the tiles located at the top of these three columns, corresponding to the entry points of sets of tiles, as described later, so that refillable tiles on the gameboard 100 are filled.

In some embodiments, the refill physics of each individual tile can be altered based on the game play of a user, or based on an instruction from the game code. Both the speed at which the game element can move and the direction in which it can move can be governed by player moves.

Whether the colour and/or shape characteristics of adjacent blocks match is determined by a match check. This check may be carried out for the whole gameboard 100 where there are blocks. All blocks on the game board may be match checked against the blocks immediately adjacent to them, for example when controlling a cascade effect between player moves. For each player move, only the block(s) which experienced the user input and/or the blocks immediately adjacent to said block are match checked against the blocks immediately adjacent to them. When multiple blocks are detected as having matching characteristics, a matching chain of blocks is formed such that even blocks which are not directly adjacent to each other are included in the same chain as long as they are connected in an adjacent manner via other blocks which also possess the same matching characteristic. In some embodiments, these chains of matching adjacent blocks may have to all be connected in one direction, i.e. they may have to be either vertically or horizontally connected. The match check is implemented after the player selects the two blocks to switch tile locations.

Figure 4:
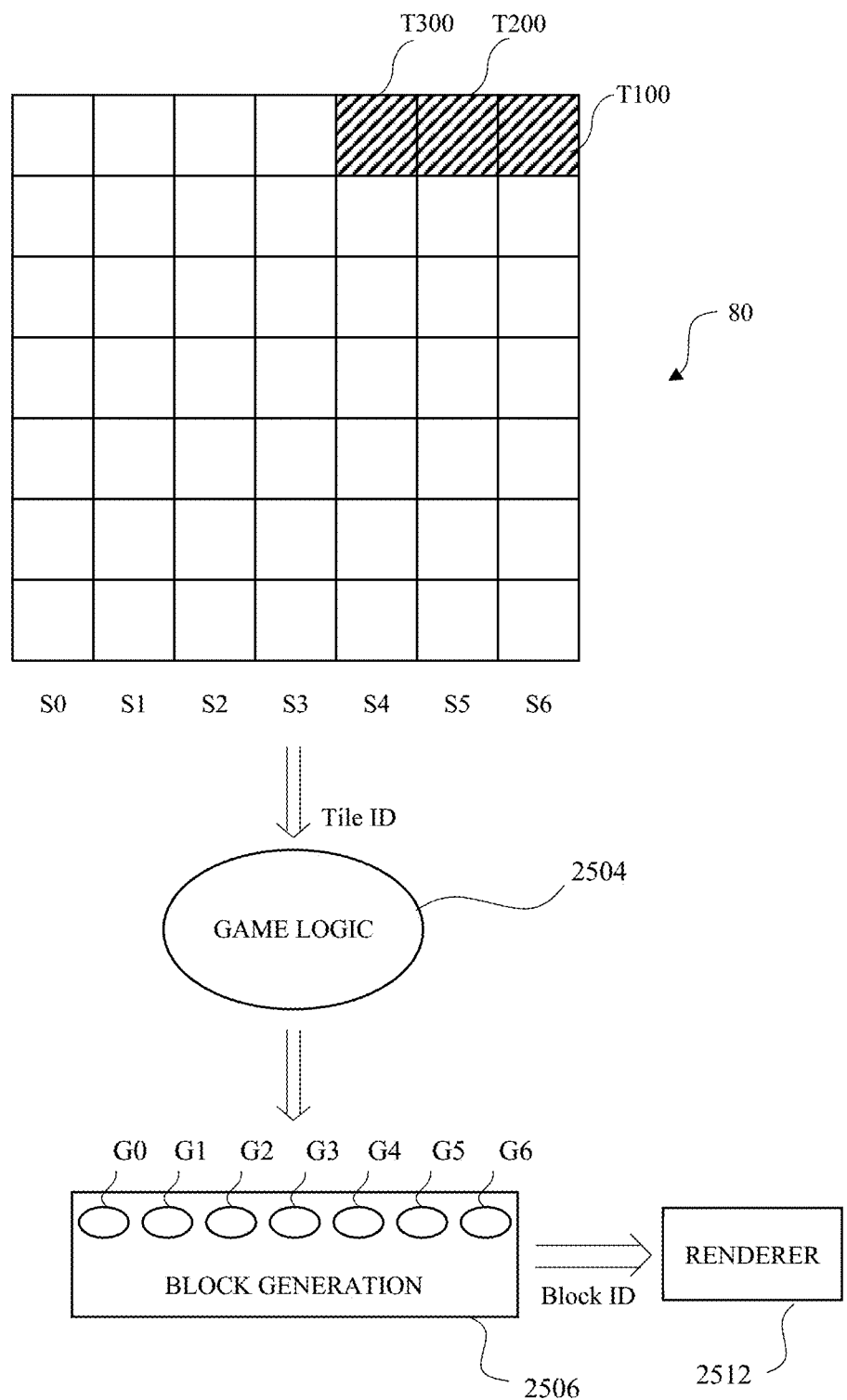
FIG. 4 is a schematic block diagram illustrating a refill process.
Figure 11:
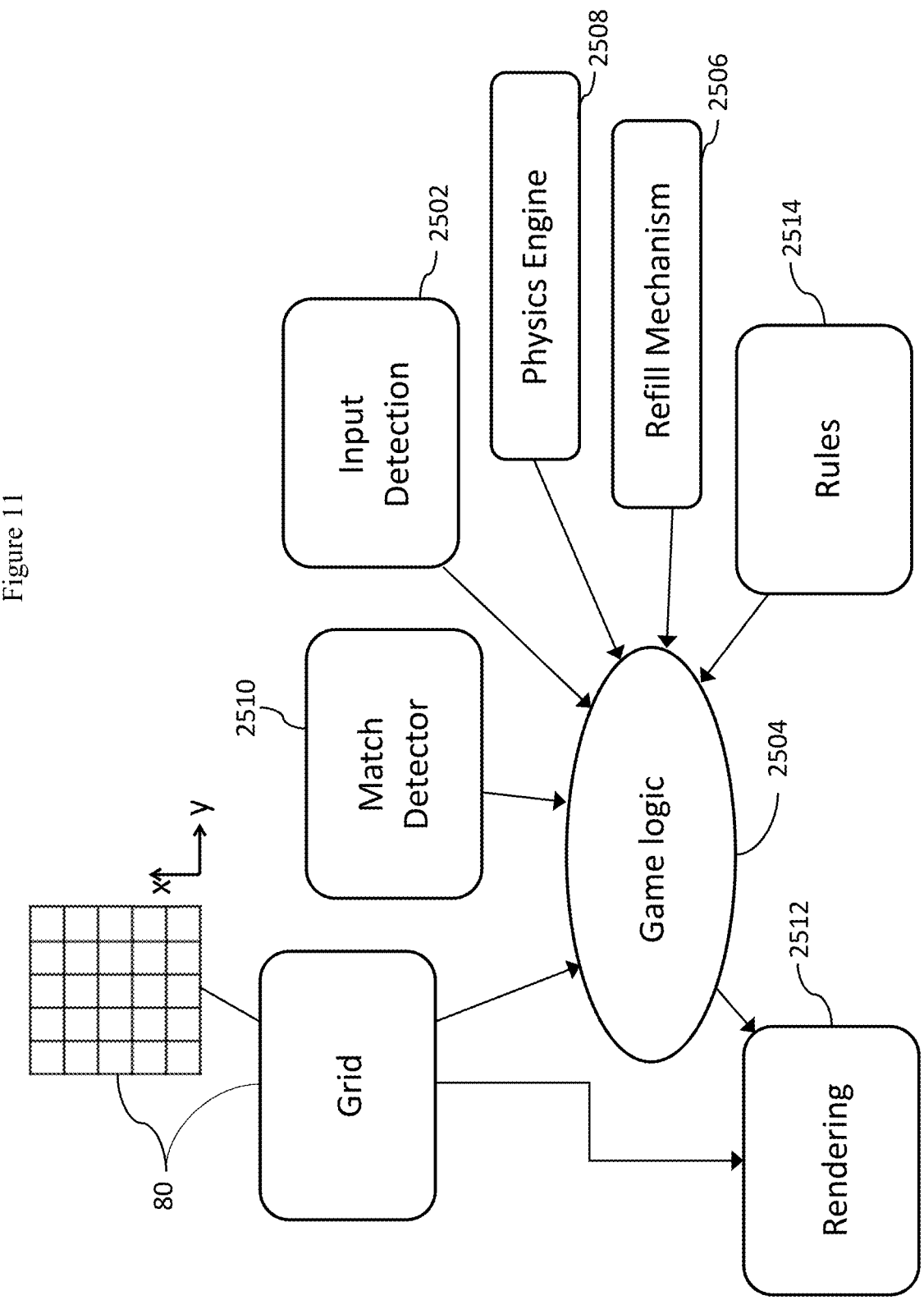
FIG. 11 shows a schematic representation of the functional blocks used to implement the present invention.

FIG. 4 is a highly schematic block diagram illustrating how gameboards are rendered visible to the user through a refill process. In the described embodiment, the refill process is set to random. In fact, the random refill process may be pseudorandom. Each game level has an initial gameboard which is a layout of tiles, each tile having a tile attribute in the initial layout. FIG. 4 shows a tile layout in the form of a grid 80. The grid can be considered as a map which may be used to determining the relative positions of tiles on the game board from a tile ID. This tile grid 80 shows an array of tiles arranged in rows and columns. In FIG. 11, the grid 80 is shown with two dimensions, x and y. However, any alpha numerical designation can be used as the tile ID. No logical relationship between tile IDs is required. However, the grid position relationship between tile IDs may be determinable from the tile ID alone, e.g. by using an array of tiles with numbered rows and lettered columns.

In order to render a game board on a display, each tile is associated with a block to be rendered at that tile location. The nature of the block, that is, for example, if the block contains a blocker or is playable (a normal game element), is determined by a tile attribute. Note that the nature of a block differs from a game element type or characteristic—a block may have the nature of 'normal' which may be fulfilled by interactive game elements of any type. The grid 80 is organised in sets S0 to S6. In this embodiment, each set represents a column of tiles in the array. However, sets may be organised in any appropriate manner. For example, they could be organised in rows or grids of tiles.

Shown in the tile grid 80 are three tiles T100, T200 and T300 which represent tiles where blocks may need to be spawned to replenish the gameboard. In a normal game refill process, new blocks are spawned in tiles that have an attribute associating them with playable (user interactable) blocks. A new block is spawned into effect at an entry point of the set. For convenience, the endmost tile (in this case T100) can be considered the entry point for S6. However, any entry point for a set can be defined, and the precise entry point may depend on the orientation or shape of the set. Blocks are spawned into sets at their respective entry points. If the tile below the entry point is vacant, the spawned block is moved down to that tile and then a further block is spawned above it at the entry point. Note that sets may be of different configurations and spawned blocks may be moved to vacant tiles according to different refill physics.

Each tile of the grid 80 may be associated with data to indicate a status, such as filled or unfilled (empty) in relation to game elements. Thus, when the game board is refilled, each tile of the grid may be checked for such a status. Upon determining that there are tiles which are empty, the need to refill these tiles is recognised. Boolean logic may be used to determine whether a tile is to be refilled using the filled status of the tiles of the grid. The tiles must satisfy the condition of being unfilled in order to be refilled. As part of the refill mechanism, empty tiles are designated as the endpoint for particular blocks. This may be as the endpoint of a block which is already in the game board and moving as a result of a game move due to the action of a physics engine 2508, or as the endpoint of a new block entering the game board.

The game includes block generation logic 2506 which comprises a plurality of deterministic game element generating algorithms labelled G0 to G6. Each set is associated with a respective game element generating algorithm which spawns the new game element in a deterministic manner for its associated set. Game logic 2504 receives a tile identifier indicating a tile into which a block is to be spawned. That is, the tile identifier indicates the set in which the tile belongs, and enables the entry point of the set to be indicated. This tile identifier enables the appropriate algorithm to be activated, and a block identifier is generated by that algorithm to a renderer 2512 which controls a display 1318 on which the game board is presented to cause that block to be inserted at the entry point. Within each set the process may be entirely deterministic. That is, blocks are provided in a predetermined sequence into the set, and moved through the set in a predetermined way. That sequence may be the same for all sets, or each set may have a different sequence. Alternatively, the blocks may be spawned in a random sequence. Randomly spawned blocks will still move through the set in a predetermined way, as dictated by the refill physics.

Each generator G0 to G6 can be controlled with a respective seed which then causes a pseudo-random sequence of blocks to be generated based on that seed.

The gameboard 100 used in gameplay is defined by the tile grid 80. A tile is rendered at a location and may support a block or have another quality e.g. a hole or blocker. Each tile has its own unique ID associated with it. Data about the game elements occupying each tile of the grid are stored in association with the name, or ID, of the tile. This data may be stored in, for example, a tile database 1603 (see FIG. 8C). When blocks are removed from the tile grid 80, tile refill occurs and the blocks located at the tiles affected by the refill process change. The data stored in the tile database is updated to represent the locations of elements on the grid 80 after refill. The position of a game element may be either where the game element is on the grid 18 or where the game element is going (e.g. the endpoint of a game element moving due to a refill). The data in the tile database is also used to represent replacement game objects of a segment as discussed later, through a segment replacement mechanism.

Holes in the grid show a background and are not valid game board areas. That is, there are no tiles at the locations of the holes. Alternatively, there may be tiles at the locations of the holes in the grid 80, but the attribute of these tiles may be holes, and their attribute remains unchanged through game play. Blocks cannot occupy holes in the gameboard, but can fall through them. The shape of the grid may vary.

The following sections will refer to a game with a switcher mechanic. The ideas explained may also be implemented for games with other mechanics. Such games are implemented on a gameboard 100 comprising a grid of tiles with fixed locations.

To exemplify the invention, one particular game will now be described. It will be evident that the features described herein may be applied in many different games.

Game Feature

The new game feature will now be described.

The gameboard may comprise one or more segments. A segment is a group (or subset) of tiles which act as a single unit with regards to a segment replacement process.

Figure 5:
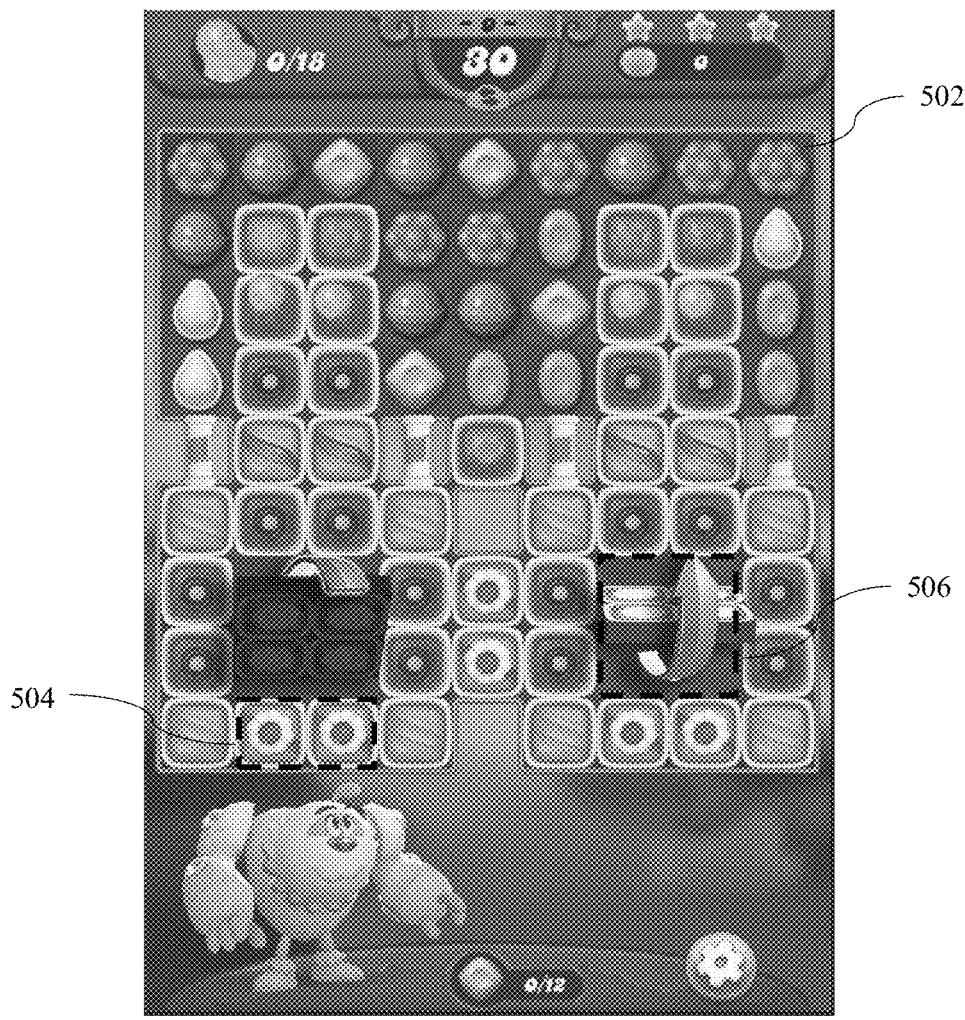
FIG. 5 shows an example gameboard for implementing segment replacement.

FIG. 5 shows an example gameboard for implementing the new game feature.

Segments 504, 506 are defined on the gameboard. Segments 504, 506 are sub-sets of tiles of the gameboard which act together under certain circumstance.

The segments 504, 506 of the gameboard may be rendered visually distinguishable to the user. For example, each segment may comprise blockers with a matching design, which differs from the design of the blockers of the surrounding segments. The segments may be visually distinguishable in other ways. For example, the tiles of the segment may be highlighted, there may be a border around the tiles of a segment, or the tiles of the segment may have a distinguishing background. If there are multiple segments on a single gameboard, the visual distinctions may be different for each segment. For example, each segment may have a different colour highlighting or border. Alternatively, the borders may have different line types and the highlighting may be of different effects such as hashing or dots.

Segments may vary in size. They may be formed of adjacent tiles, for example in a square or rectangle or may be any configuration of non-adjacent tiles. In some embodiments, only rectangular/square tile configurations are possible. Two different segments are identified in FIG. 5. There is a 2×2 segment 506 and a 2×1 segment 504. These two segments can be identified by the distinguishable patterns shown on the tiles. Here, the tiles of the segment are adjacent to one another.

In some embodiments, the tiles of a segment need not be situated next to each other. For example, a segment may comprise three tiles spread over the gameboard such that they are not adjacent to one another, but are nevertheless replaced at the same time.

In one embodiment, the user must remove blockers from all tiles associated with a segment in order to satisfy a segment condition. This is can be achieved by generating a match-3 condition adjacent to one or more of the blockers, referred to as a blocking element removal condition. The matching game elements and the one or more blockers directly adjacent to the matching elements are removed from the gameboard.

The blockers situated at the segment tiles may be multi-layer blockers. These blockers have a predefined number of layers which the user has to remove in order to remove the whole blocker from the tile. A single layer is removed from the multi-layer blocker when a match-3 condition is satisfied adjacent to the multi-layer blocker, such that a blocking element layer removal condition is satisfied. For such blockers, the blocking element removal condition is only satisfied when the final layer of the blocker is removed from the gameboard.

In other embodiments, other segment conditions may be defined. For example, the segment condition may be satisfied when a pre-defined number of a certain game element are located at the segment. For example, the segment condition may be satisfied when three green game elements are located at the segment. Another example of a segment condition may be a requirement to remove a predefined number of game objects from the tiles associated with the segment, or collect a predefined number of points through match-3 condition associated with one or more tiles of the segment. For example, the user may be required to remove a total of 5 game objects from any of the tiles associated with the segment. It will be appreciated that the example segment conditions disclosed herein are not limiting. In the examples presented herein, the example segment condition used is that of requiring all blockers to be removed from the segment tiles.

The tiles of the segment may all initially be associated with blocker elements. Alternatively, some of the tiles of the segment may initially be associated with other kinds of game objects, such as boosters, user interactable game elements, or freeable object elements. It will be appreciated that any other game object may be associated with the segment on the initial gameboard. In some embodiments, there may be at least one blocker element associated with the segment on the initial gameboard.

Once all of the blockers are removed from a segment, a replacement group of game objects is selected, and the game objects of the segment are replaced with said replacement group. The tiles associated with the segment alter their attributes. That is, once the replacement has been implemented, the tiles of the segment no longer act as a unit. The tile characteristics of the segments are replaced with a replacement group of game objects. For example, the tiles may be populated with blockers or boosters. Examples of possible replacement groups of game objects are discussed later with reference to FIGS. 10A-10E.

The replacement group may be predefined. That is, the type of blocks in the replacement group and/or their layout in the segment may be predefined. The type of block may define only the overall characteristic of the block, e.g. blocker, user activatable game element (normal, booster, freeable object, etc.), or it may define the exact characteristics such as the type (e.g. colour) of the replacement blocks. The layout of the blocks within the segment may be predefined or randomised when the blocks populate the segment.

The blocks in the replacement group may be randomised. That is, there may be no predefined replacement blocks. Rather, the blocks of the replacement group are randomly generated when segment replacement occurs.

In some embodiments, the segment replacement process renders the tiles of the segment as empty spaces on the gameboard into which game objects can move as a result of the gameboard refill mechanism.

The segments act to expand the gameboard. The gameboard size may be limited by the size of the display. However, the replacement of the segments acts to increase the effective size by changing the tile of a sector of the gameboard, rather than tile by tile, during gameplay.

The segments also allow gameboard refill to be supplemented with a predefined segment replacement process. The replacement group of game objects which are spawned in the replacement process can be used to provide the user with additional challenges. For example, the replacement group of game elements may comprise blockers which the user has to remove from the gameboard, or special elements which the user has to collect by moving to the bottom of the gameboard. These elements can be predefined to be presented to the user on the gameboard rather than randomly spawned in the game refill mechanism.

It will be noted that, although the replacement group of game elements is spawned at the segment tile locations, no further game elements are spawned at these locations in the normal refill process. That is, the segment tiles do not become entry points for gameboard refill.

The segments may be pre-defined for the level. There may be a pre-defined layout of segments on the gameboards for the level. Alternatively, the number of segments or tiles to be assigned segments may be pre-defined, but the layout of the segments on the gameboard may be randomly generated prior to the gameboard being rendered to the user.

Figure 7:
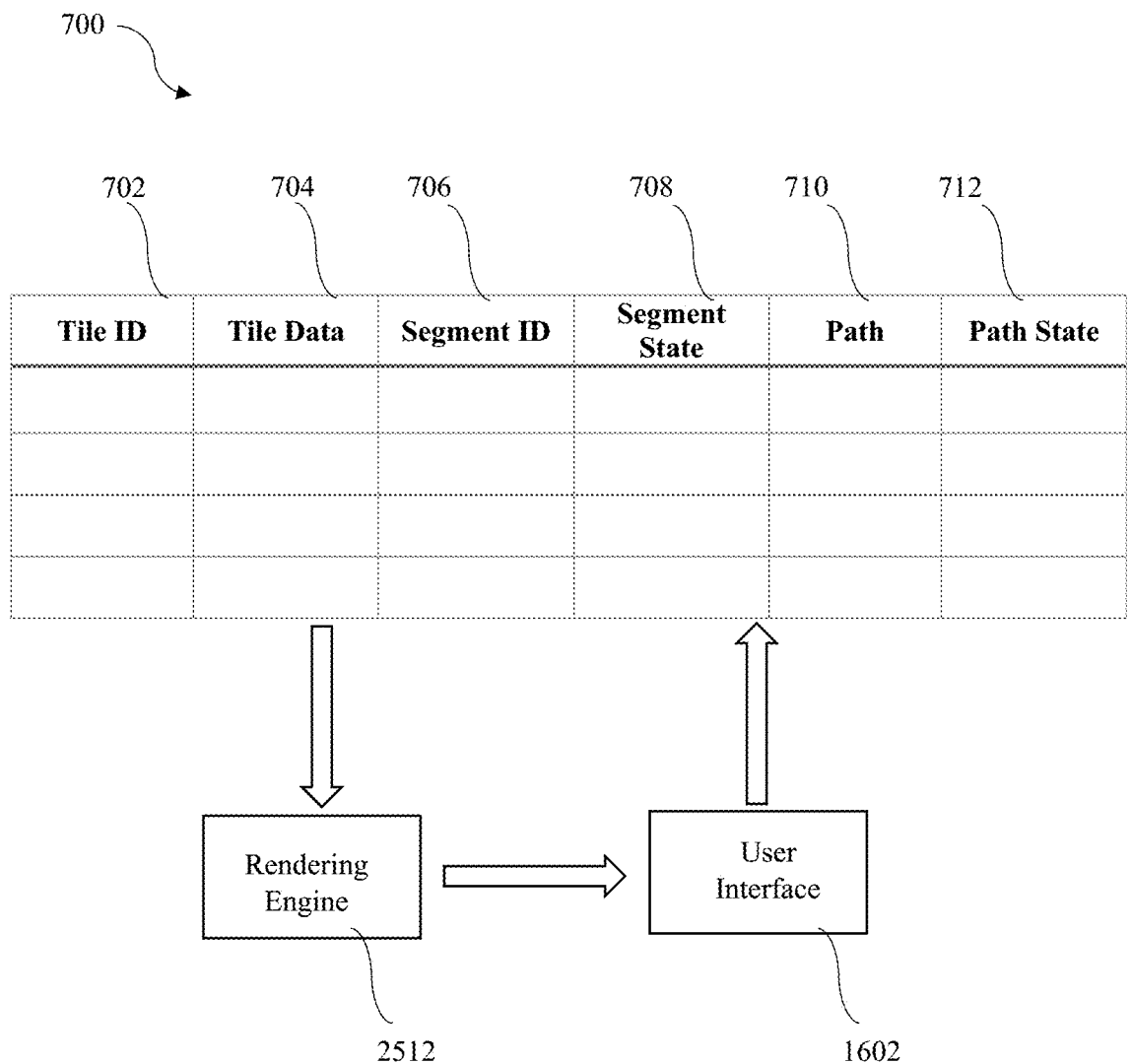
FIG. 7 shows a data structure for managing tile data.

FIG. 7 illustrates a data structure for managing the segments and path of the gameboard, and schematically illustrates the interrelation between the data structure 700 and a rendering engine 2512 of the graphics controller 1308. The graphics controller 1308 is illustrated in FIG. 2. The data structure 700 can be held in any suitable storage circuitry, such as illustrated by memory 1306 in FIG. 2. The rendering engine 2512 controls the display on a user interface 1602 which receives the video output from the graphics controller 1308 illustrated in FIG. 2. The user interface 1602 may comprise the input device 1322 and the display 1318. These components may be one entity, such as a touchscreen, or they may be separate entities, such as a screen and a mouse. Alternative embodiments of these devices are discussed earlier with reference to FIG. 2.

The activity at the user interface 1602 can cause the characteristics 704 of each tile to be altered by way of switching the location of blocks on the gameboard and generating match-3 conditions, that is by removing blocks from the gameboard, and the subsequent gameboard refill. In some embodiment, this user activity alters a state of the segments 708 and a state of the path 712. The data structure 700 is responsible for managing how the visualisation of replenished tiles and the path are delivered to the user interface. Each tile has a tile ID 702. The tile ID 702 can define the location on the user interface where the tile is to be replenished, that is governed by the vacancy which has been generated due to the removal of game elements from the gameboard. This allows the rendering engine 2512 to generate that tile at an appropriate location on the user interface display 1602. Each tile ID 702 is associated with some tile data 704 which defines how the tile is to be displayed, that is what game element it has associated with it, and whether it has any "blockers" (or other special game elements) in addition to or instead of a game element.

A separate field can hold a segment ID 706. Not every tile on the gameboard need be associated with a segment ID 706. If a tile ID 702 is associated with a segment ID 706, this indicates that the tile associated with said tile ID 702 forms part of a segment of the gameboard, each segment being associated with a different segment ID 706. Thus, the segment ID 706 associated with the tile ID 702 defines which segment of the gameboard the tile is associated with.

In some embodiments, there is also provided a segment state 708 field. The segment state 708 is common to all tiles in the same segment. There are two possible segment states 708, active and non-active. Segments start in an active state. When all blocks are removed from the segment, the segment state 708 changes to a non-active state.

In the active state, the tiles associated with segments act together as a segment. That is, when a block is removed from a tile in the active segment state, all other tiles in the same segment are be checked to see if the segment condition has been met.

In the non-active state, the tiles no longer act together with respect to the segment replacement process. That is, when a game object is removed from the segment, the other tiles in the segment do not need to be checked.

In other embodiments, there is no segment state 708 defined, such that after segment replacement occurs a first time, the tiles of the segment continue to act as a segment, so if the segment condition is satisfied a second time, the game objects associated with the segment are again replaced with the replacement group of game objects. This may repeat until the user completes the level.

Figure 6:
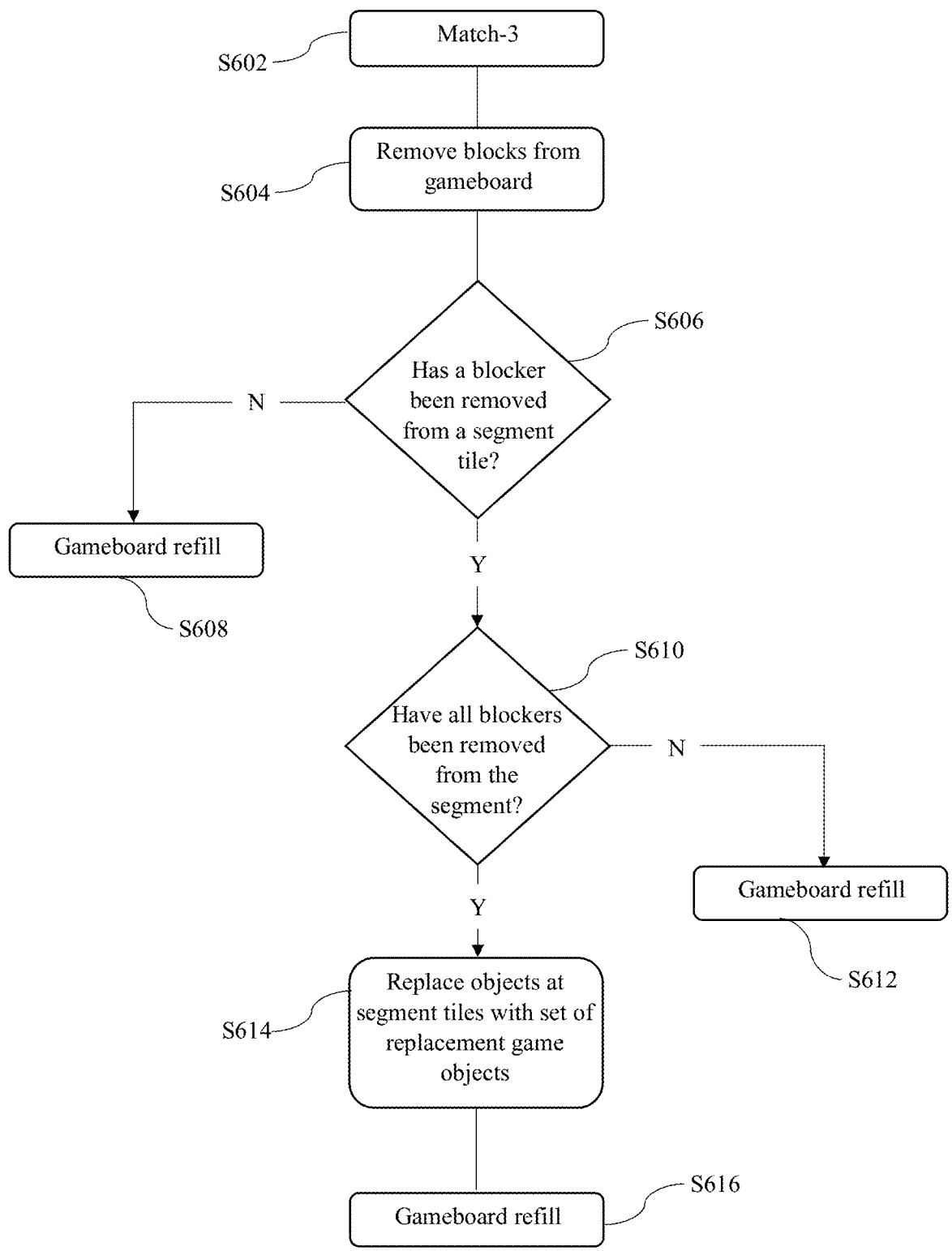
FIG. 6 shows an example process for implementing segment replacement.

FIG. 6 shows an example process for determining when to implement a replacement. The example of FIG. 6 uses the segment condition of having to remove blockers from the segment. It will be appreciated that other segment conditions may be implemented, and the process for these is discussed later.

At step S602, a match-3 condition is achieved on the gameboard. The data structure 700 is accessed and the tile data associated with the tile IDs 702 in question is checked. If the tile data 704 matches, there is a match-3 condition. As described above, this results in the removal of the matching blocks from the gameboard. In some instances, additional blocks are also removed. For example, if any of the blocks in the match-3 condition is adjacent to a blocker, the blocker is also removed from the gameboard. The tile data 704 for the tiles surrounding the tiles of the match-3 condition is therefore also checked to determine if any of these blocks are blockers and should therefore be removed from the gameboard. It will be appreciated that match-3 refers to a match condition comprising at least three adjacent matching game elements. In some embodiments, the match condition may be that of at least two matching adjacent game elements.

Once it has been determined which blocks on the gameboard are to be removed as a result of the match-3 condition, the blocks are removed, step S604.

At step S606, it is determined if any of the blocks removed were from segment tiles. The segment ID 706 associated with each tile from which blocks have been removed is checked. If there no segment ID 708 associated with the tiles in question, no blockers have been removed from segments, in which case, gameboard refill occurs, step S608, via the refill process described above. In some embodiments, only tiles from which blockers have been removed are checked for a segment ID.

If, however, one or more of the blocks removed as a result of the match-3 condition are from segment tiles, that is, there is a segment ID 706 associated with the one or more of the tile IDs 702, all of the tiles associated with the same segment ID 706 are checked to determine if a segment condition has been met. In the example presented herein, the segment condition is that of having to remove all blockers from the segment, so, at step S610, a check is performed to determine if all blockers have been removed from the segment. That is, it is determined if the blocker removed as a result of the match-3 condition is the last blocker which needed to be removed from the segment.

If more than one blocker is removed from a segment tile as a result of the match-3 condition, the blockers may be from different segments. In this case, each set of segment tiles, that is, the tiles associated with the same segment ID 706, is checked independently, such that whether all blockers have been removed from a segment is determined for each individual segment. That is, the tile data 704 for all tile IDs 702 associated with the same segment ID 706 are checked.

If it is determined, at step S610, that not all of the blockers have been removed from a segment, that is, there are still blockers located at segment tiles, the segment condition has not been met and the gameboard is refilled S612.

However, if all of the blockers located at the tiles of a segment have been removed, such that the segment condition has been met, replacement occurs at the locations of the segment tiles, step S614. The objects situated at the segment tiles are replaced with a replacement group of game objects. The replacement group may be selected as a predefined group. The exact game elements to be spawned at the segment tiles may form the predefined group. The configuration of these elements within the segment may also be defined. Alternatively, the predefined group may be formed of a defined type of game element to be spawned at the segment tiles, but the spawning may be randomised. Alternatively, the replacement group may be selected by random spawning of any type of game element at the segment tiles. The tile data 704 associated with the tiles of the segments is replaced with tile data 704 associated with the replacement group of game objects.

In some embodiments, the characteristics of the tiles of the segment may also be replaced with replacement characteristics. For example, the segment state 708 of the tile changes from active to non-active.

After replacement, gameboard refill occurs, step S616.

It will be appreciated that the steps of the exemplary process of FIG. 6 may be performed in a different order. For example, the step of removing blocks from the gameboard, step S604, may be implemented immediately before the step of gameboard refill, S608, S612, S616, but after checking segments.

There may be an additional step after step S606 if one of the removed blocks is removed from a segment tile. The additional step may be that of determining if the segment is still active. The segment state 708 of the tile is checked. If the segment is still active, the process proceeds to step S610, where the other tiles of the segment are checked. However, if it is found that the segment is no longer active, there is no need to check the other tiles of the segment as it has previously been determined that all of the tiles are free of blockers and the characteristics have already been replaced, so the process moves to the step of gameboard refill.

There may be an additional step prior to the replacement of the game elements at the segment tiles at which the gameboard is refilled, after the blockers on the segment have been removed, the gameboard may be refilled prior to the replacement of the game elements at the segment tiles with the replacement group of game objects.

In a more general process, once a match-3 condition is detected on the gameboard, step S602, the tiles associated with any subsequent removal of game objects from the gameboard or gameboard refill may be checked. If any of the tiles from which game objects have been removed or into which game objects have moved are associated with a segment, the other tiles of the segment are checked to see if the segment condition has been satisfied. If it has, the game objects associated with the game element are replaced with the replacement group of game objects.

Figure 12:
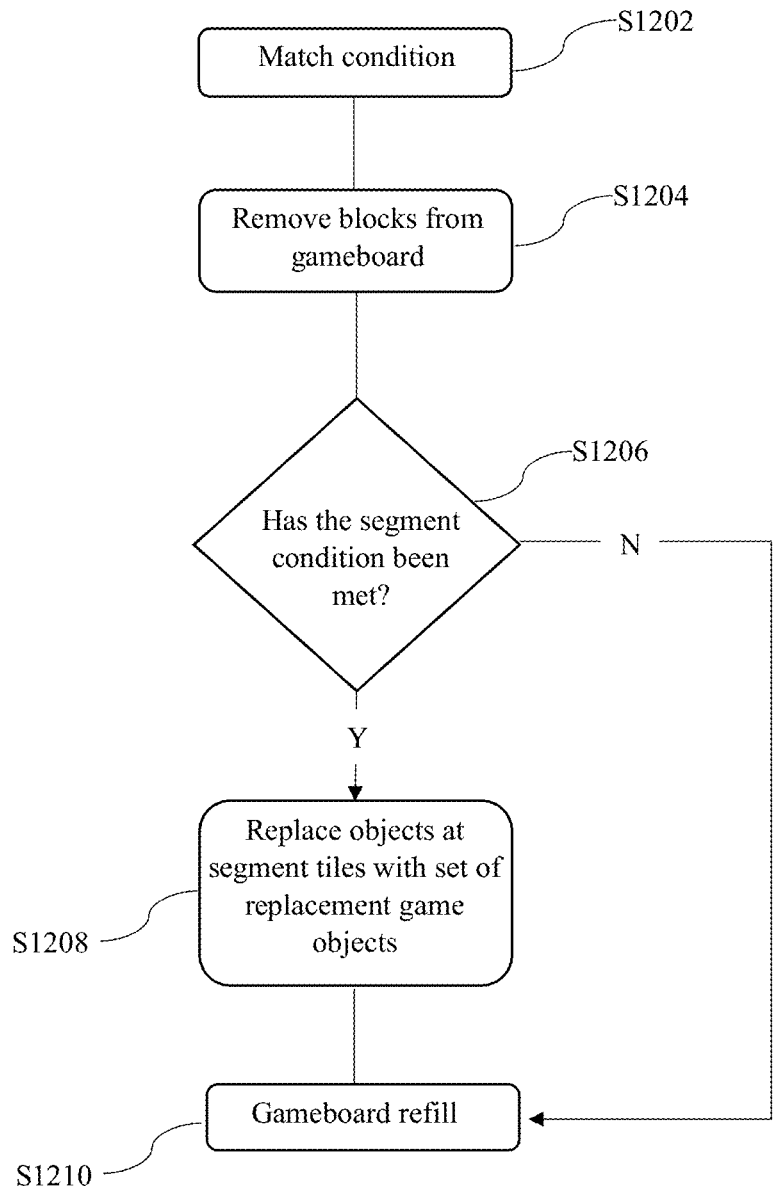
FIG. 12 shows another example process for implementing segment replacement.

FIG. 12 shows an example of this more general process.

At step S1202 a match condition is detected. The match condition is satisfied when there is a plurality (e.g. two or more) adjacent user activatable game elements having matching characteristics on the gameboard. The blocks to be removed from the gameboard as a result of the match condition are established, including any blockers or other game elements which are not involved directly in the match condition but are to be removed as a result of the match condition, and these blocks removed at step S1204.

In some embodiments, step S1202 is replaced with a step of detecting a user interaction which results in a change in the gameboard. The user may, for example, cause two game elements to switch locations, or drag one game element to the location of anther game element on the gameboard causing the two elements to combine. If the change caused by the user interaction results in the removal of blocks from the gameboard, step S1204, the process proceeds to step S1206. Blocks may be removed by a match condition and/or a characteristic of the combined elements being activated which removes game elements from the gameboard which are not involved in a match condition, for example. Such special game elements are referred to as "boosters". Boosters may be activated in other ways, such as being adjacent to a match condition.

In some embodiments, if the user may switch the location of two game elements but there is no resulting match condition or removal of blocks, the game elements return to their original locations such that there is no change in the gameboard and the process does not proceed to step S1206. However, in other embodiments, the switched or moved game elements remain in their new locations. In such an embodiment, the gameboard has changed but no blocks are removed from the gameboard. Step S1204 is removed from the process shown in FIG. 12 such that, after the change in gameboard is detected, the process proceeds to step S1206.

At step S1206, it is determined if the segment condition of a segment has been met. This step may only occur if, as in the example of FIG. 6, it has previously been established that at least one of the blocks removed in step S1204 was removed from a tile associated with a segment. However, in some embodiments, the segment conditions of each segment of the game board may be checked every time blocks are removed from the gameboard. This may be required if the segment condition is not defined by blocks being removed from the segment. For example, if the segment condition is that there are a predefined number of a certain kind of block on the segment, for example green blocks, then the segment must be check irrespective of whether a block was removed from the segment since blocks removed from below the segment would cause the blocks at the segment toles to change. In such an embodiment, gameboard refill occurs prior to the segment condition being checked at step S1206.

Determining if a segment condition has been met is discussed above with reference to FIG. 6. This data stored in association with the tiles of a segment are checked. For example, the tile data 704 may be accessed to determine the types of blocks located at the tiles of the segment. The data structure 700 may store other data associated with the tile IDs 702 which is relevant to the segment condition. For example, if the segment condition is that a number of blocks must have been removed from any of the tiles of the segment, there may be an additional data field associated with each tile ID 702 which stores the number of tiles which have been removed from the gameboard form that tile over the course of the game. In such an example, this data is accessed and used to determine if the segment condition is met.

If it is determined that the segment condition has not been met, the gameboard is refilled, step S1210.

Alternatively, if it is found that the segment condition for one or more segments is met, the process proceeds to step S1208 at which the objects at the segment tiles are replaced with the set of replacement game objects.

The gameboard is then refilled, step S1210.

In some embodiments, gameboard refill occurs prior to establishing is a segment condition has been met, S1206. In such an embodiment, step S1210 after step S1206 may not be needed. In some embodiments, the gameboard is refilled prior to replacement at the segment tiles, step S1208.

The replacement process may be rendered visible to the user. For example, the segment may appear to 'flip' when the characteristics are replaced. An example of a segment flip is shown in FIG. 8D.

FIG. 10A-10E show some example replacement groups of game objects which may replace the game elements at the segment tiles when the segment condition is met. Each example shows a replacement group of game objects 1002 at the location of the segment 812 after the replacement has occurred.

Figure 10A:
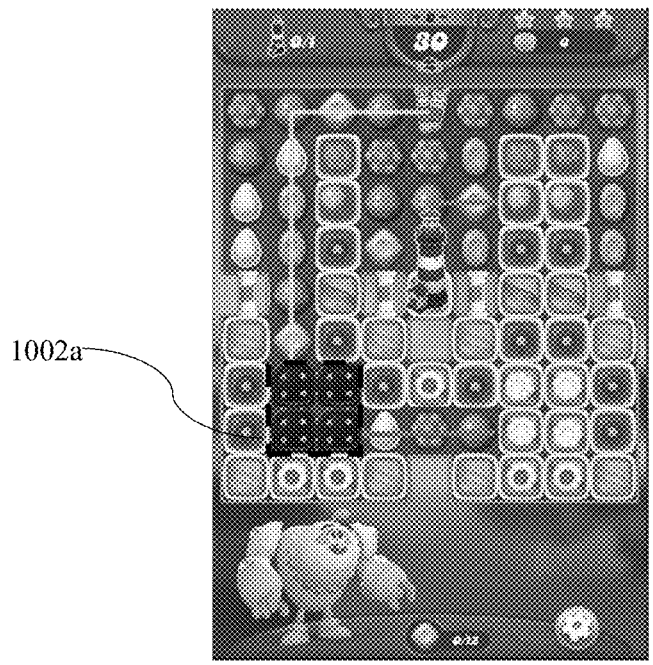
FIGS. 10A-10E show examples of replacement groups of game objects which are presented to the user after segment replacement.

FIG. 10A shows the replacement group of game objects 1002a comprising four liquorice laces blocking elements. These blocking elements act as a string of blockers such that, when one is removed as a result of an adjacent match-3 condition, all blocking elements in the string are removed.

Figure 10B:
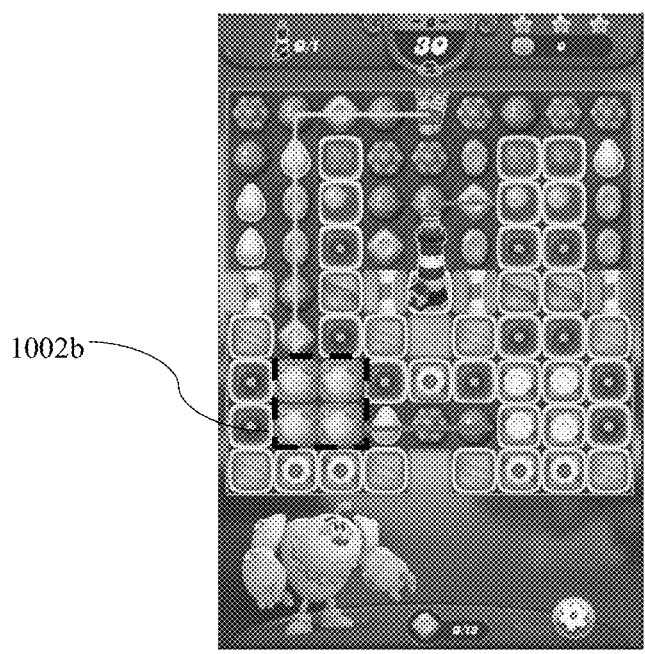

It will be appreciated that the replacement group of game objects 1002a may comprise any type of blocking element. For example, FIG. 10B shows the replacement group of game objects 1002b comprising four bubble-gum blockers. These blockers are removed in a similar way to other blockers, but if not removed, spread to other adjacent tiles over time.

Figure 10C:
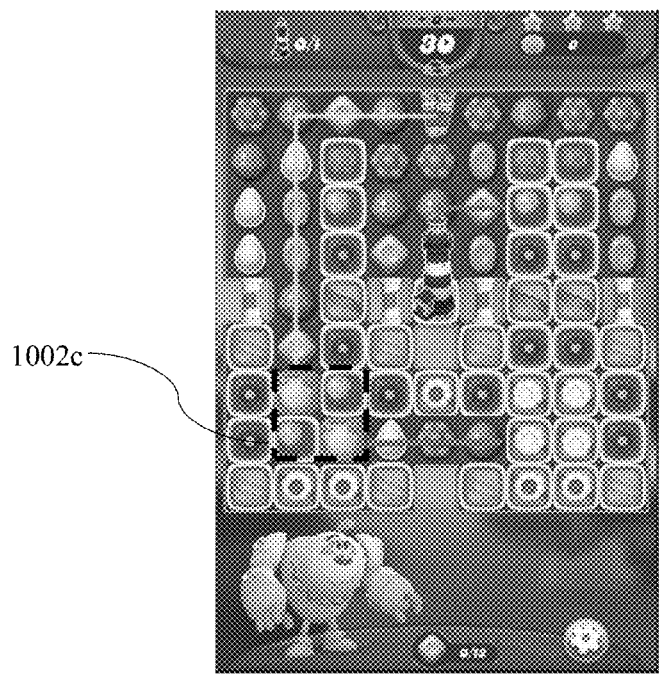

FIG. 10C shows an example of the replacement group of game objects 1002c comprising a combination of element types. In this example, there are two different types of elements in the replacement group 1002c: blockers and game objects which include freeable elements. The freeable elements are released when there is an adjacent match-3 condition. The freeable elements contribute to a game objective, for example the user may have to collect the freeable elements are the bottom of the gameboard. The location of the different types of game elements within the replacement group 1002c may be predefined or they may be randomly allocated when the replacement occurs.

It will be appreciated that the replacement group of game objects may comprise only game objects comprising freeable elements. The replacement group of game objects may comprise game objects comprising freeable game elements and at least one other type of user interactable game element or blocking element.

Figure 10D:
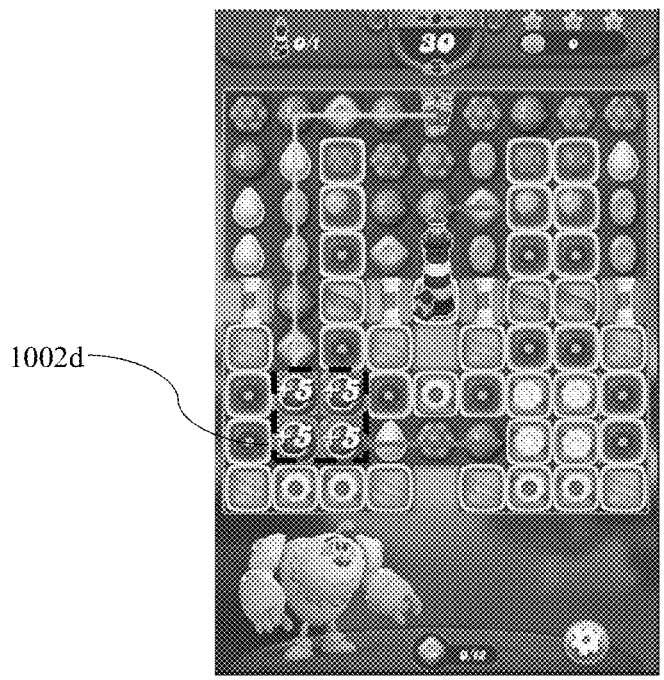

FIG. 10D shows a replacement group of game objects 1002d comprising chocolate egg boosters, which, when removed by an adjacent match-3 condition, provide the user with 5 additional moves in which to complete the level.

Figure 10E:
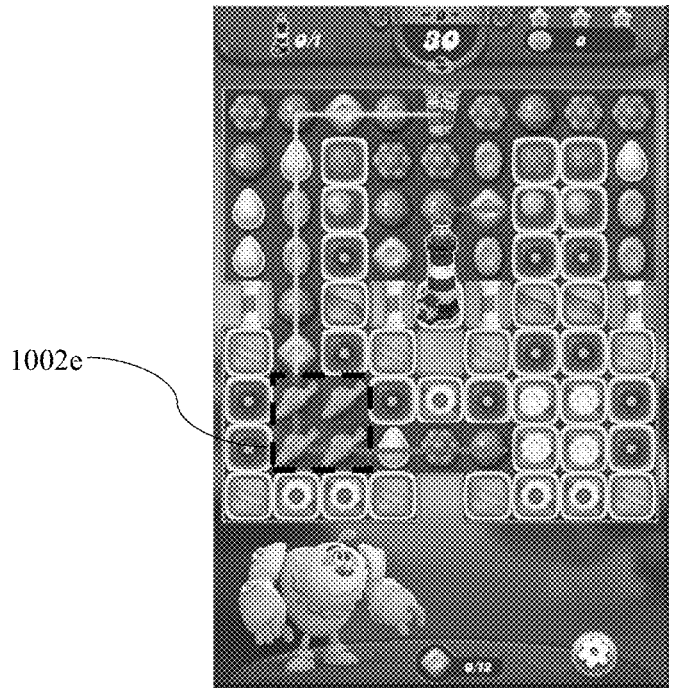

It will be appreciated that any booster elements may be provided to the user in the replacement group 1002d. For example, FIG. 10E shows the replacement group of game objects 1002e comprising jelly fish boosters. These booster elements remove a predefined number of game elements of the same colour which are not involved in the match-3 condition when they are removed from the gameboard.

The replacement group of game objects 1002 of FIGS. 10A-10E are given as examples. Although not shown, the replacement group of game objects 1002 may comprise "normal" game elements, that is game elements which do not have any special characteristics. It will be appreciated that other combinations of game objects may be provide as the replacement group of game objects 1002 on the replacement of segments. A single type of game object may be provided, or any combination of different types may be provided. The combination may comprise any blocking elements and/or any user activatable game elements (e.g. boosters, freeable element blocks, normal game elements, etc.).

Game Mode

The new game mode will now be described.

The new game mode implements the gameboard segments as described above, and introduces a new goal to be achieved by the user in order to complete the level, that of connecting a path between a predefined start and end point. This new goal may be the only goal the player has to achieve, or it may need to be achieved in combination with one or more other goals. For example, the user may have to connect the path, collect a predefined number of points by removing blocks from the gameboard, and/or collect a predefined number of special blocks in order to achieve the level.

Figure 8A:
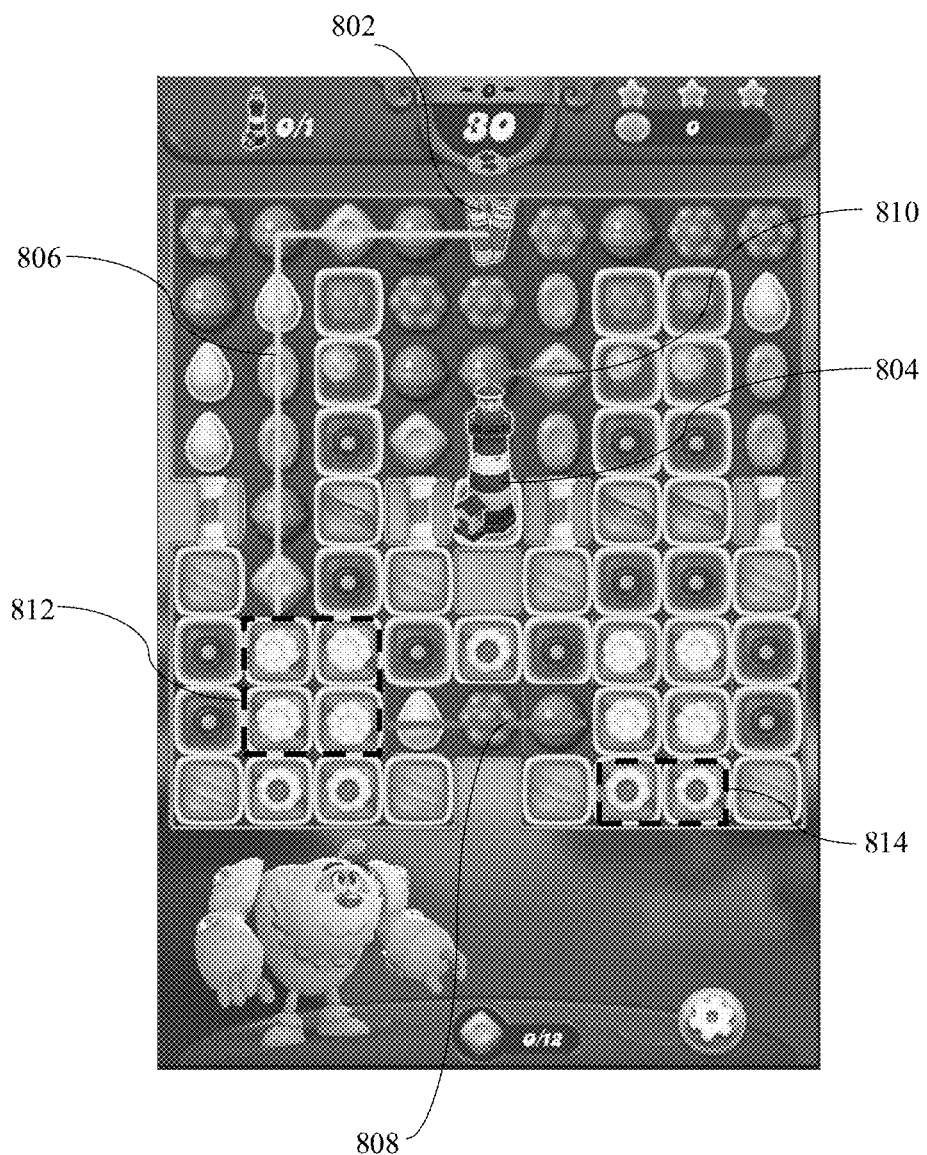
FIGS. 8A-8F illustrate a new game mode in which the user reveals a path by implementing segment replacement.

FIG. 8A shows an example gameboard for implementing the new game mode.

There is a predefined origin tile 802, here associated with a visual representation of a pair of batteries, although it will be appreciated that any image may be used to signify the origin tile 802.

There is also a predefined end tile 804, here associated with the visual representation of a lighthouse. Again, any image may be used to signify the end tile 804.

The locations of the start and end tiles 802, 804 are predefined.

There is a predefined path connecting the start and end tiles 802, 804 on the gameboard. The path is divided into path components, where each tile through which the path crosses may comprise a single path component.

When the user begins the level, the path is initially hidden. Alternatively, some components of the path may be visible to the user, while other path components are missing or not visible. Any path components visible to the user, whether initially rendered to the user or revealed to the user through game play, help the user to infer the tile locations of the hidden path and so decide where to target matches. The user replaces segments in order to reveal the hidden path.

In some embodiments, some path components may not be associated with gameboard segments but may also not be rendered visible to the user on the initial gameboard. In such an embodiment, the initially non-visible path component may be revealed to the user when he removes a game element from said tile via a match condition.

Through gameplay, the user may reveal sections of the path which are not connected.

FIG. 8A shows three parts 806, 808, 810 of the path which have been revealed. The first component or part 806 is connected to the start point 802, so is a connected part of the path. As it is connected, it is shown to be 'lit-up'. This allows the user to easily identify where there are gaps in the path.

The second and third parts 808, 810 are not connected to the start tile 802 since there is a gap in the rendered path between the first part 806 which is connected and the other two parts 808, 810. The unconnected parts 808, 810 are shown to be 'dimmed'.

The data structure 700 shown in FIG. 7 may comprise two further fields when implementing the new game mode, a path field 710 and a path state field 712.

The path field 710 defines whether the tile location is associated with a component of the path, and the orientation of the path component. The orientation may also define if the path component is a corner and the layout of the corner. In some embodiments, paths may split or branch, for example to reach more than one end point. In such an embodiment, the path component may be some form of junction such as a T-junction or fork.

There may be three possible path states 712 associated with each path component. The path component may be non-visible. For example, if the path component is hidden by a segment which is still active or missing from the gameboard, the path is not rendered visible to the user. The path component may be hidden by a game object such as a blocker. For example, if the replacement group of game objects comprises a path component and a blocking element on the same tile, the path component may still be non-visible even after segment replacement as it is hidden from view by the blocker, and may remain non-visible until the blocker is removed from the tile.

The path may be inactive. In an inactive state, the path component is rendered visible to the user, but it is not connected in the path. In such a state, it is not visually enhanced in any way. For example, the path components comprising the unconnected parts 808, 810 are inactive.

The path component may be active. That is, the path component is rendered visible to the user and is connected in the path. An active section may be rendered differently to the user to an inactive path component. For example, the active section may be lit up', shown in a different colour, or differentiated in some other visible way. That is, an active path component is visually enhanced when it is in the active state. The connected path section 806, for example is active.

The start and end tiles 802, 804 are defined by the tile data 704 of the associated tile. The origin and end tiles 802, 804 are fixed for the level. That is, the location on the gameboard of the origin and end tiles 802, 804 is unaffected by gameboard refill such that they do not move when the gameboard is refilled.

Figure 8B:
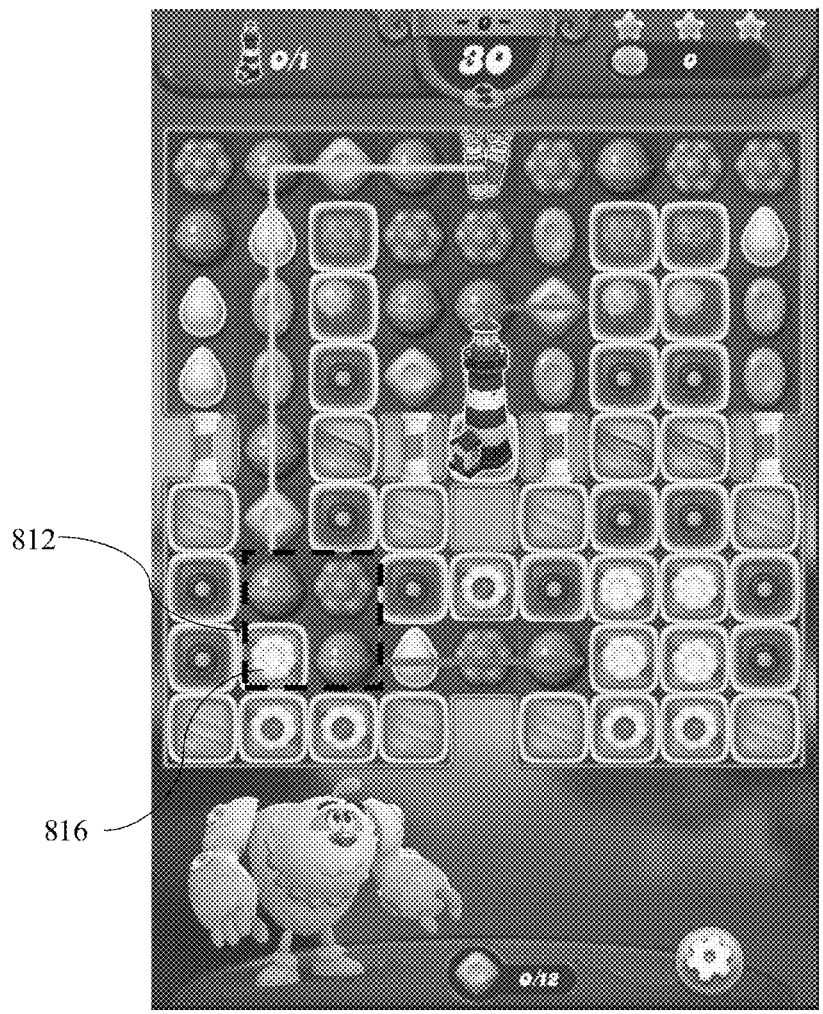

FIG. 8B shows the gameboard of FIG. 8A after the user has implemented one or more plays which have resulted in three of the blockers associated with a 2×2 segment 812 being removed from the gameboard.

There are blocks shown associated with the tiles of the segment 812 from which the blockers have been removed. These may move into the tile locations via gameboard refill.

In some scenarios, the empty spaces left after blockers are removed may not be filled via the gameboard refill process. This may be because there are other elements on the gameboard which prevent the tiles being refilled, such as a blocker situated above the empty tile such that game elements cannot fall into the empty space.

It can be seen that a single blocker 816 remains on the 2×2 segment 812.

Figure 8C:
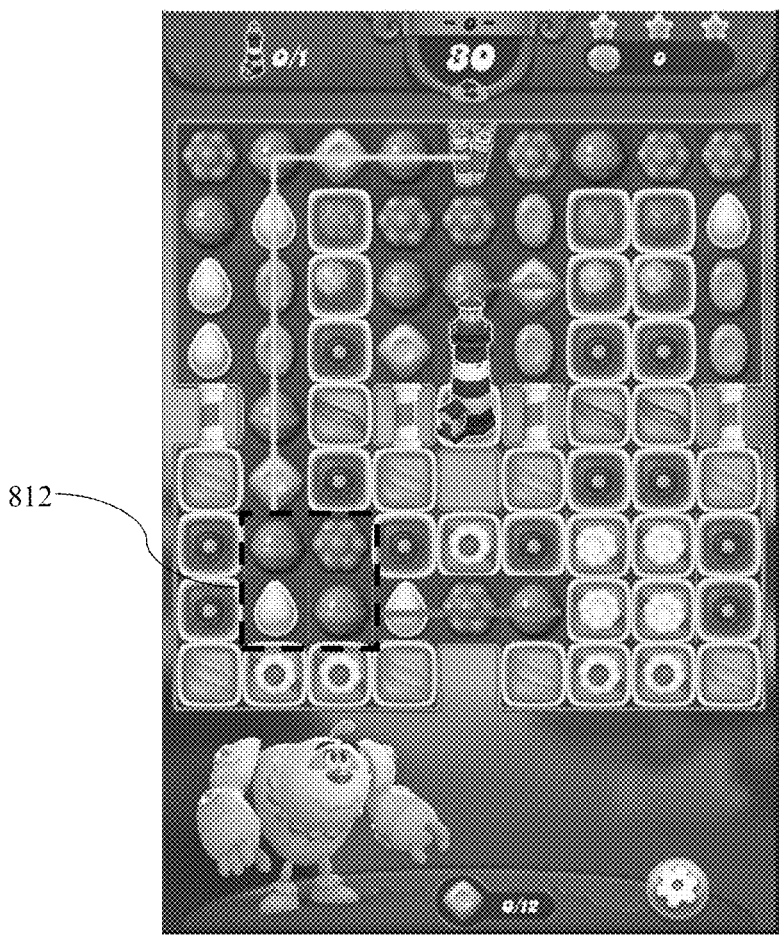
Figure 8D:
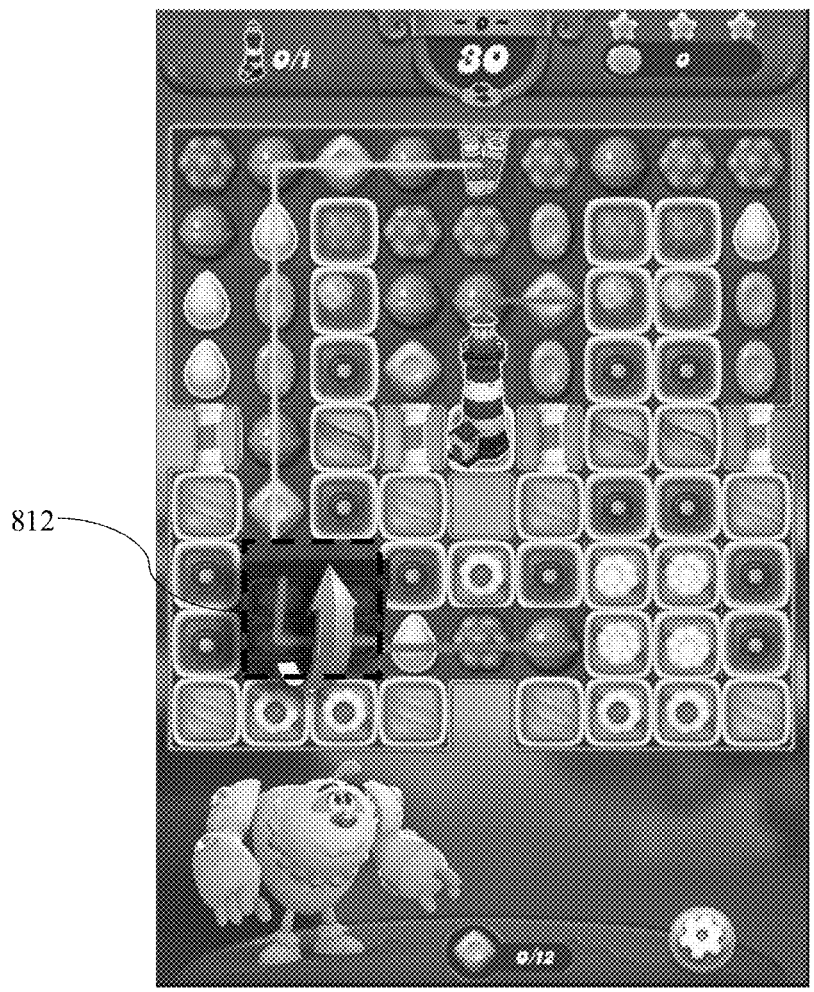

FIG. 8C shows the gameboard after the blocker 816 has been removed. There are now no blockers located at the 2×2 segment 812. As such, the segment can be replaced.

FIG. 8D shows a way in which the replacement may be visualised to the user by flipping the tiles of the segment 812. It will be appreciated that the replacement may be visualised in some other way. For example, the segment may be seen to fly out of the gameboard and the replacement fly into the gameboard. Alternatively, the segment may be shown to dissolve and the replacement appear in its place.

Figure 8E:
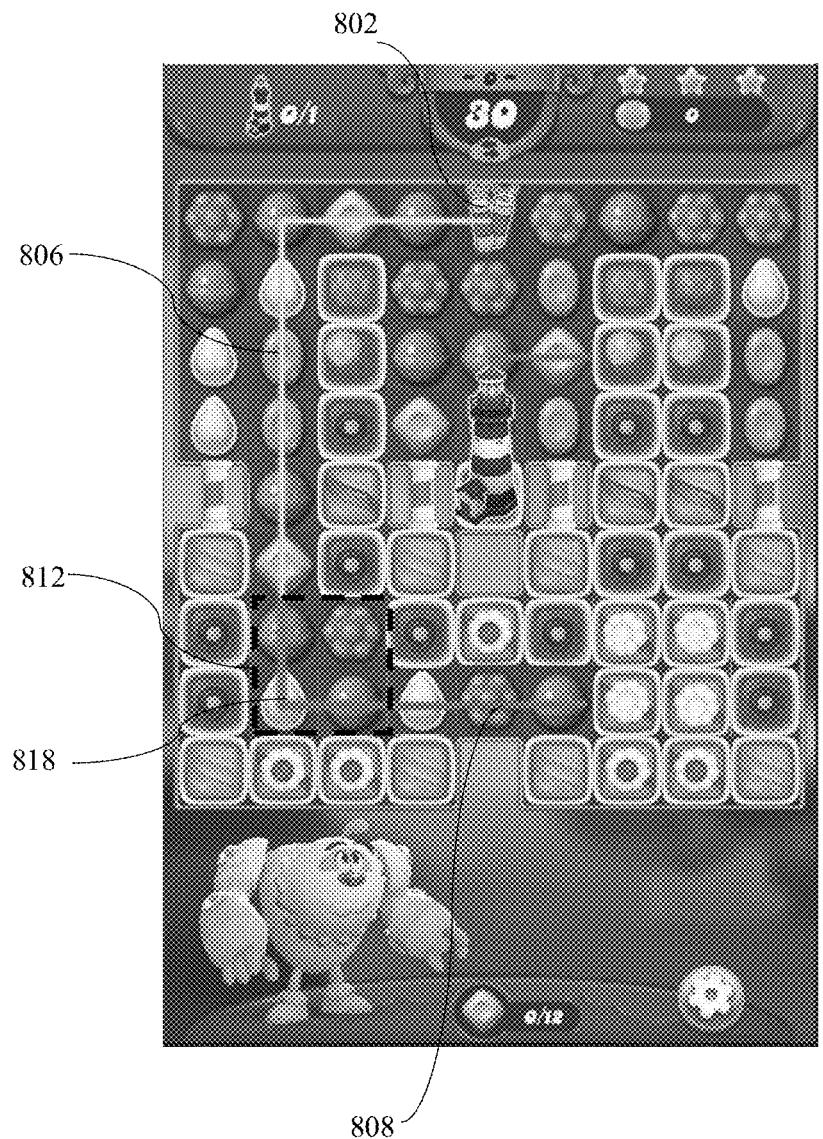

A part of the path can be seen on the underside of the segment 812 in FIG. 8D. FIG. 8E shows the gameboard after the segment 812 has flipped. The revealed part 818 of the path can be seen.

In some scenarios, the blockers on the tiles at which the path is to be rendered are removed but the path is not visualised. This would occur, for example, if the last blocker to be removed from the 2×2 segment 812 were situated in the top right-hand corner of the segment 812 such that the segment conditions had not been met. The blockers from the whole segment 812 need to be removed before the path associated with any tile of the segment is rendered visible to the user.

Immediately after the replacement, the revealed part 818 is shown as inactive. A check is carried out to determine if the revealed part 818 is connected to the start point 802. In this example, the revealed part 818 is connected to the first part 806. As such, it is connected to the start point 802. The revealed part 818 is also connected to the second part 808, such that the second part 808 is now connected to the start point 802. As such, all connected parts 806, 818, 808 have an active path state 712.

Figure 8F:
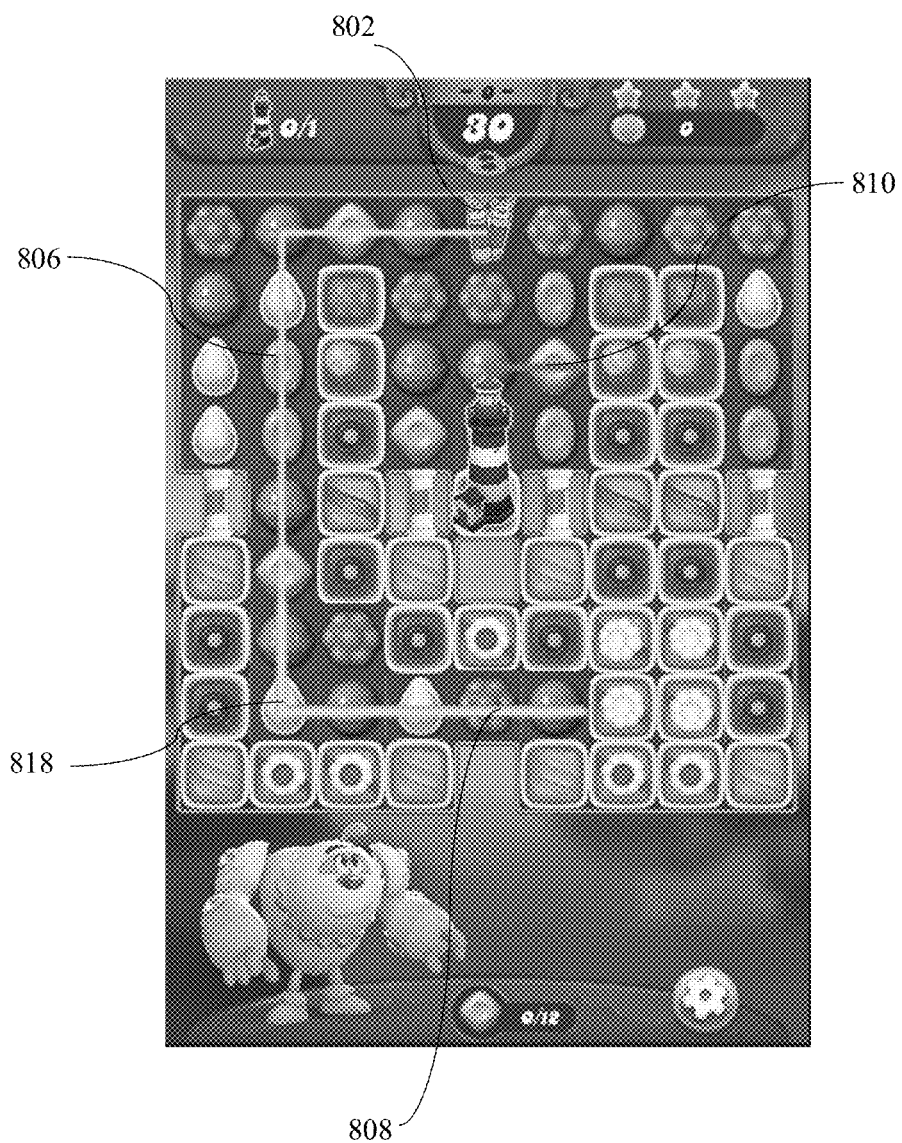

FIG. 8F shows how the now connected parts 806, 818, 808 are rendered to the user on the gameboard. The connected parts 806, 818, 808 are shown to be lit-up, while the still unconnected third part 810 is remains dimmed.

Once the user has revealed all sections of the path between the start and end point 802, 804, the path is considered complete and the whole path will be rendered as lit-up.

Although the game elements in the surrounding tiles of the segment 812 shown in FIGS. 8A-8F do not change, it will be appreciated that these game elements will change during normal game play via the removal and refill mechanisms.

Figure 9:
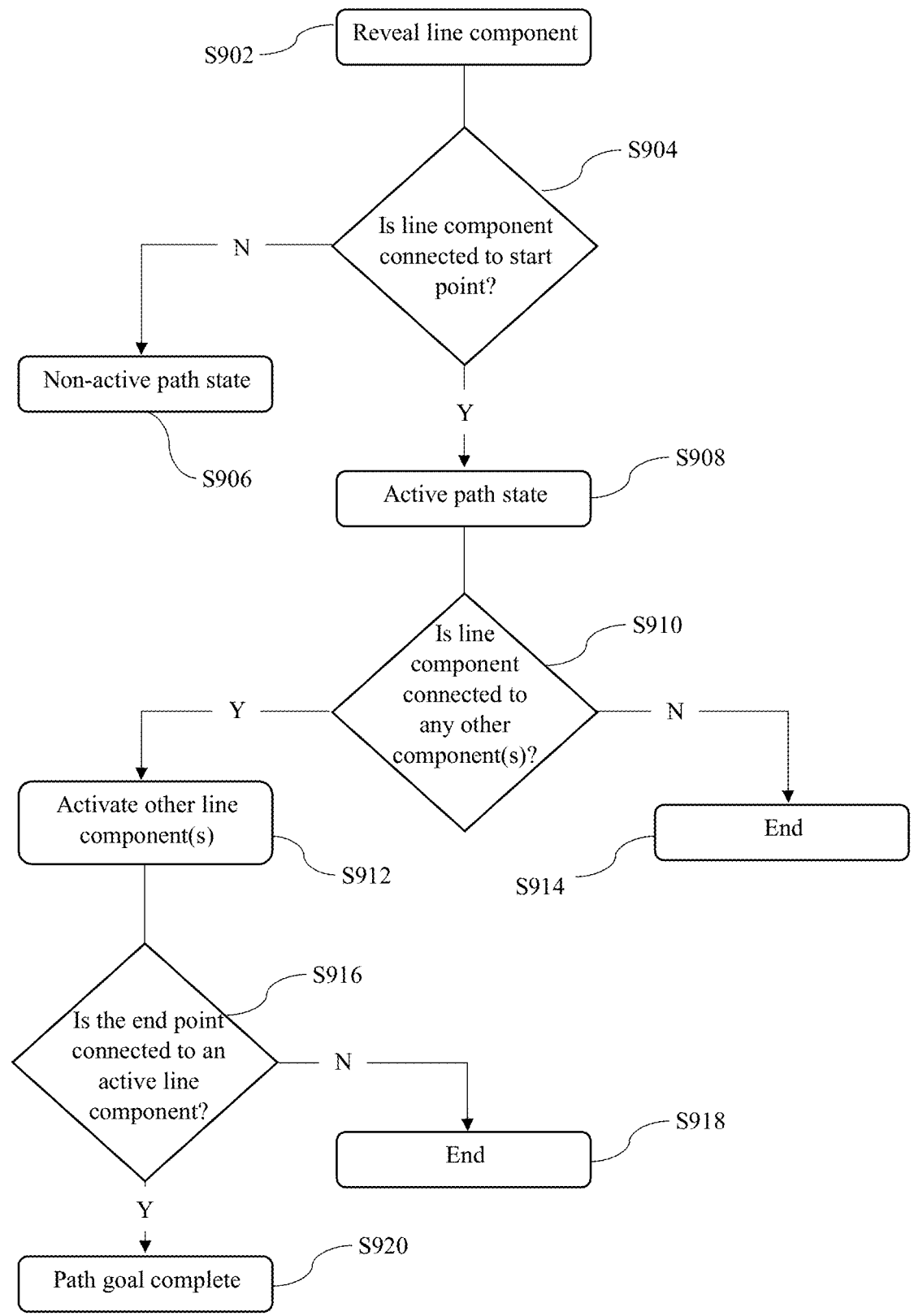
FIG. 9 is an example process for revealing the path.

FIG. 9 shows an example process for determining if the path is connected and complete.

At step S902, a path component is revealed. This may be revealed when a segment is replaced. When a segment is replaced, the path field 710 is checked. If there is an entry in the path field 710 of any of the segment tiles, the path state 712 associated with the tile is changed from non-visible to inactive, such that the path component(s) is rendered visible to the user on the gameboard.

It is then determined if the newly revealed path components are connected to the start point 802, step S904. The tiles surrounding the tile with the newly revealed path component are checked for path components by accessing the path field 710 of the data structure 700 for each of the surrounding tiles. In some embodiments, the orientation of the newly revealed path many be taken into account, such that only the tiles that could contain connecting path components are checked. For example, if the newly revealed path component is a vertical path component, only the tiles above and below the tile in question need to be checked.

If it is found that any of the surrounding tiles contain path components, the orientation of the path component in the tile is checked. If the orientation is such that the newly revealed path component is connected to the neighbouring path component, the path state 712 of the path component is checked. If it is active, the newly revealed path component is connected to the start point 802 and thus the path state 712 of the revealed component changes from inactive to active, step S908.

If, however, there are no connecting path components in an active state in the surrounding tiles, the path component remains in a non-active state, step S906.

After the path state is changed from non-active to active, step S908, it is determined if the path component is connected to any other components which are currently inactive, S910. That is, it is determined if the newly revealed path component connected to path components which were previously revealed but not previously connected to the start point 802.

The tiles surrounding the tile of the newly revealed component are checked for path components as above. If one or more are found, the path state 712 is checked. If this is set to inactive, the path state 712 is changed to active, step S912.

If a previously inactive path component is activated, any path components it is connected to are also activated at step S912. A similar check to that carried out at step S910 is performed for each newly activated path component.

If the newly revealed component is found not to be connected to any inactive path components at step S910, the process ends, step S914.

Once all of the now connected components have been activated at step S912, it is determined if the end point 804 is connected to an active path component, step S916. This may be achieved by checking the tiles surrounding the end point 804 tile to determine if the tile containing the path component with the correct orientation is in an active path state 712. Alternatively, the tile location of the last path components to be activated may be identified and the tiles surrounding that tile checked for the end point 804. Alternatively, the path state 712 of all tiles may be checked. If it is found that all tiles comprising a path component are in an active state, the end point 804 must be connected to an active path component.

If it is found that the activated path is connected to the end point, the user has connected the start and end tiles 802, 804 and so has completed the path goal, step S920.

However, if the end tile 804 is not connected to an active path component, the path goal has not been achieved and the process ends, step S918.

When the path goal has been completed, step S920, no further path checks need to be carried out when segments are replaced.

It will be appreciated that the steps of the example process may be implemented in a different order, or other steps may be included or implemented instead.

In the example of FIGS. 8A-F, there is a single path connecting one start tile 802 to one end tile 804. In some embodiments, there may be more than one start or end tiles 802, 804 such that the path branches. Alternatively, there may be multiple start and end tiles 802, 804 with a single path connecting each pair of start and end tiles 802, 804.

FIG. 11 shows a schematic representation of the functional blocks of an embodiment of the present invention used to enable game play, such as that discussed above. Input detection 2502 captures the user input and feeds the input to the game logic 2504. The user input can be provided via any suitable user input device, such as those described above. In the context of the game, this user input can be used in a game view to indicate which game objects have been selected by a user, and thus to indicate the blocks to be switched and checked for adjacent matching blocks. The game logic 2504 will process the information provided by the user input. The game logic 2504 may then determine if a valid selection has been made, and what the outcomes of the selection should be.

The rendering block is used to render the gameboard 100 to the user. It renders the game elements on the gameboard 100, as well as the path and the visualisation, if any, of the segment replacement. Each time game element moves tile location, for example, during gameboard refill, the rendering block is used to render this movement visible to the user on the display 1318 of the user device 240. The rendering block may also be used to render the path when in both an active and inactive state on the user interface, as well as the visually distinguishable segments and the flipping of the segment when segment replacement occurs.

The grid component 80 stored in a memory provides a grid representation of the game board as shown schematically in FIG. 11. The grid component can be supplied by any suitable data structure, held in a local memory or remote memory accessible by the device, and is responsible for identifying each tile location on the game board and thus providing a tile ID with which to associate information about the game element displayed at that tile location. This associated information may then be used in combination with other components in order to control the rendering of the display, e.g. a match detector component 2510, and a refill mechanism component 2506.

Each game element has object data associated therewith. The object data may be stored in any suitable memory location. In some embodiments, the object data may be provided by a data structure. In some embodiments, the object data may be considered to be part of the game logic and in other embodiments may be considered to be outside the game logic. The object data may provide information as to the properties of a game element or block. These properties can include attribute information of type/characteristic such as colour and/or whether or not a game element has a particular function such as a booster function and/or whether the block is sortable.

The game logic 2504 will determine the blocks selected by a user, and the actions to follow to implement the game mechanic.

Thus, the game logic controls the rules for determining if a valid group has been selected for removal from the gameboard. The game logic 2504 operates according to a set of rules of the level the user is playing. The predefined criteria may be embodied in these per-level rules, or may be generic to multiple levels. The game logic will have access to data for each tile including its tile ID designating its location on the grid 80, and associated tile data providing information about the contents of that tile, e.g. the game element within that tile, at least one characteristic associated with the game element within the tile. The game logic 2504 will thus be able to determine the game elements to be removed from those respective tiles for each user selection.

The rules 2514 may also define the segment condition which must be satisfied for segment replacement to occur. The game logic 2504 determines if the segment condition has been satisfied by accessing the data associated with each tile of the gird 80 and comparing the data to the segment condition.

The physics engine component 2508 is configured to control the movement of moving game elements in the display. It may control the movement of both the game elements and the tile characteristics. The physics engine 2508 may be part of the game logic 2504.

It will be appreciated that, whilst specific embodiments of the invention have been described, these are not exhaustive. The scope of the invention is not defined by the described embodiment but only by the appendant claims.

The invention claimed is:

1. A computer device having:
   a user interface configured to provide a game board comprising tiles supporting game objects, wherein at least some of the tiles support game objects which are user activatable game elements of differing characteristics, wherein a pre-defined plurality of the tiles constitutes a segment of the game board supporting a group of game objects;
   the user interface configured to detect user input when a user engages with a user activatable game element; and
   a processor configured to receive a detected user input with a user activatable game element, detect a match game condition of a plurality of adjacent user activatable game elements having matching characteristics, and configured to remove the plurality of game elements of the match game condition when a match game condition is detected and to generate new game elements to replenish the game board;
   the processor further configured to detect a segment condition associated with the pre-defined plurality of tiles of the segment, and in that case to replace the group of game objects on the tiles of the segment with a replacement group of game objects;
   wherein the replacement group of game objects is a predefined group.

2. The computer device according to claim 1, wherein the group of game objects on the predefined plurality of tiles of the segment comprises at least one blocking element, and wherein the processor is further configured to detect if the user input causes a blocking element removal condition to be satisfied and if so, to remove one or more blocking element from the segment.

3. The computer device according to claim 2, wherein the segment condition is a condition in which no blocking element remains on the predefined plurality of tiles of the segment.

4. The computer device according to claim 2, wherein after the removal of a blocking element from the segment, the supporting tile of the segment is replenished with a new game object, unless detection of the segment condition has caused replacement of the group of game objects on the tiles of the segment with the replacement group of game objects.

5. The computer device according to claim 2, wherein the blocking element removal condition is satisfied if the blocking element is adjacent to at least one of the game elements of the match game condition.

6. The computer device according to claim 5, wherein the blocking element removal condition is satisfied if the blocking element comprises a last layer of a multi-layer blocking element, the other layers of the blocking element having previously been removed from the gameboard in one or more prior blocking element layer removal condition.

7. The computer device according to claim 1, wherein the game objects of the replacement group are provided on the gameboard at the same time.

8. The computer device according to claim 1, configured to generate a path comprising path components to be rendered on the gameboard, wherein at least one path component is displayed on an initial game board, and at least one path component is missing on the initial game board, the missing path component provided at one or more tiles of the segment after the replacement group of game objects is provided on the gameboard.

9. The computer device according to claim 8, wherein at least one of the game objects of the replacement group of game objects provides a visual indication of the missing path component.

10. The computer device according to claim 8, configured to render a visual enhancement of path components when connected by a previously missing path component now provided on the gameboard.

11. The computer device according to claim 8, wherein the path is generated from a defined origin tile to a defined target tile.

12. The computer device according to claim 8, wherein the path comprises at least one branch component.

13. The computer device according to claim 1, wherein the replacement group of game objects comprises blocking elements.

14. The computer device according to claim 1, wherein the replacement group of game objects comprises booster elements.

15. The computer device according to claim 1, wherein the replacement group of game objects comprises game objects which comprise freeable elements, the freeable element being released from the game object when the match game condition is detected adjacent to the game object, the freeable element contributing to a game objective.

16. The computer device according to claim 1, wherein the replacement group of game objects is a combination of any of blocking elements and user activatable game elements.

17. The computer device according to claim 1, configured to render a 3D visual animation of providing the replacement group of game objects as a flipping of a plane of tiles from a first virtual image of the game objects in an initial group of game objects on one side of the plane to a second visual animation of the replacement group of game objects on the other side of the plane.

18. The computer device according to claim 1, configured to render a visual indication of the segment to the user.

19. The computer device according to claim 1, wherein the pre-defined plurality of tiles of the segment are adjacent to one another.

20. A method of controlling a user interface, the method comprising:
providing a game board at the user interface comprising tiles supporting game objects, wherein at least some of the tiles support game objects which are user activatable game elements of differing characteristics, wherein a pre-defined plurality of the tiles constitutes a segment of the game board supporting a group of game objects;
detecting user input at the user interface when a user engages with a user activatable game element; and
receiving at a processor a detected user input with a user activatable game element, detecting a match game condition of a plurality of adjacent user activatable game elements having matching characteristics, removing the plurality of game elements of the match game condition when a match game condition is detected, and generating new game elements to replenish the game board;
detecting by the processor a segment condition associated with the pre-defined plurality of tiles of the segment, and in that case replacing the group of game objects on the tiles of the segment with a replacement group of game objects; and
wherein the replacement group of game objects is a predefined group.

21. A non-transitory computer readable medium comprising computer-executable code which when executed by one or more processing units causes the following method to be performed, the method comprising:
providing a game board at the user interface comprising tiles supporting game objects, wherein at least some of the tiles support game objects which are user activatable game elements of differing characteristics, wherein a pre-defined plurality of the tiles constitutes a segment of the game board supporting a group of game objects;
detecting user input at the user interface when a user engages with a user activatable game element; and
receiving at a processor a detected user input with a user activatable game element, detecting a match game condition of a plurality of adjacent user activatable game elements having matching characteristics, removing the plurality of game elements of the match game condition when a match game condition is detected, and generating new game elements to replenish the game board;
detecting by the processor a segment condition associated with the pre-defined plurality of tiles of the segment, and in that case replacing the group of game objects on the tiles of the segment with a replacement group of game objects; and
wherein the replacement group of game objects is a predefined group.

22. A computer device having:
a user interface configured to provide a game board comprising tiles supporting game objects, wherein at least some of the tiles support game objects which are user activatable game elements of differing characteristics, wherein a pre-defined plurality of the tiles constitutes a segment of the game board supporting a group of game objects;
the user interface configured to detect user input when a user engages with a user activatable game element; and
a processor configured to receive a detected user input with a user activatable game element, detect a match game condition of a plurality of adjacent user activatable game elements having matching characteristics, and configured to remove the plurality of game elements of the match game condition when a match game condition is detected and to generate new game elements to replenish the game board;
the processor further configured to detect a segment condition associated with the pre-defined plurality of tiles of the segment, and in that case to replace the group of game objects on the tiles of the segment with a replacement group of game objects,
wherein the group of game objects on the predefined plurality of tiles of the segment comprises at least one blocking element, and wherein the processor is further configured to detect if the user input causes a blocking element removal condition to be satisfied and if so, to remove one or more blocking element from the segment.

23. A computer device having:

a user interface configured to provide a game board comprising tiles supporting game objects, wherein at least some of the tiles support game objects which are user activatable game elements of differing characteristics, wherein a pre-defined plurality of the tiles constitutes a segment of the game board supporting a group of game objects;

the user interface configured to detect user input when a user engages with a user activatable game element; and a processor configured to receive a detected user input with a user activatable game element, detect a match game condition of a plurality of adjacent user activatable game elements having matching characteristics, and configured to remove the plurality of game elements of the match game condition when a match game condition is detected and to generate new game elements to replenish the game board;

the processor further configured to detect a segment condition associated with the pre-defined plurality of tiles of the segment, and in that case to replace the group of game objects on the tiles of the segment with a replacement group of game objects; and configured to generate a path comprising path components to be rendered on the gameboard, wherein at least one path component is displayed on an initial game board, and at least one path component is missing on the initial game board, the missing path component provided at one or more tiles of the segment after the replacement group of game objects is provided on the gameboard.

24. A computer device having:

a user interface configured to provide a game board comprising tiles supporting game objects, wherein at least some of the tiles support game objects which are user activatable game elements of differing characteristics, wherein a pre-defined plurality of the tiles constitutes a segment of the game board supporting a group of game objects;

the user interface configured to detect user input when a user engages with a user activatable game element; and a processor configured to receive a detected user input with a user activatable game element, detect a match game condition of a plurality of adjacent user activatable game elements having matching characteristics, and configured to remove the plurality of game elements of the match game condition when a match game condition is detected and to generate new game elements to replenish the game board;

the processor further configured to detect a segment condition associated with the pre-defined plurality of tiles of the segment, and in that case to replace the group of game objects on the tiles of the segment with a replacement group of game objects; and configured to render a 3D visual animation of providing the replacement group of game objects as a flipping of a plane of tiles from a first virtual image of the game objects in an initial group of game objects on one side of the plane to a second visual animation of the replacement group of game objects on the other side of the plane.

* * * * *